US011213018B2

(12) United States Patent
Bruno et al.

(10) Patent No.: US 11,213,018 B2
(45) Date of Patent: Jan. 4, 2022

(54) PEST RESISTANT BIRD FEEDER

(71) Applicant: Classic Brands, LLC, Denver, CO (US)

(72) Inventors: John Bruno, Parker, CO (US); Stephen Combs, Denver, CO (US); Lindsey Nifong, Denver, CO (US); Robert Donegan, Denver, CO (US); Bryan Krueger, Denver, CO (US)

(73) Assignee: CLASSIC BRANDS, LLC, Denver, CO (US)

( * ) Notice: Subject to any disclaimer, the term of this patent is extended or adjusted under 35 U.S.C. 154(b) by 277 days.

(21) Appl. No.: 15/919,044

(22) Filed: Mar. 12, 2018

(65) Prior Publication Data
US 2019/0159432 A1 May 30, 2019

Related U.S. Application Data

(63) Continuation-in-part of application No. 29/627,598, filed on Nov. 28, 2017, now Pat. No. Des. 851,842.

(51) Int. Cl.
*A01K 39/012* (2006.01)
*A01K 39/01* (2006.01)

(52) U.S. Cl.
CPC ...... *A01K 39/0113* (2013.01); *A01K 39/0125* (2013.01)

(58) Field of Classification Search
CPC .................. A01K 39/0113; A01K 39/0125
See application file for complete search history.

(56) References Cited

U.S. PATENT DOCUMENTS

| 2,634,705 A | 4/1953 | Mayes |
| 2,683,440 A | 7/1954 | Klix |
| 2,773,474 A | 12/1956 | Nugent |
| 2,856,898 A | 10/1958 | Doubleday |
| 2,891,508 A | 6/1959 | Bower |

(Continued)

FOREIGN PATENT DOCUMENTS

CA   3036025 A1   9/2019

OTHER PUBLICATIONS

"Belle Fleur Wild Bird Products Catalog," Hiatt Manufacturing, Incorporated, Catalog No. 1, 2010, 16 pages.

(Continued)

*Primary Examiner* — Peter M Poon
*Assistant Examiner* — Morgan T Barlow
(74) *Attorney, Agent, or Firm* — Polsinelli PC

(57) ABSTRACT

Systems and methods for resisting intrusion by a pest include a reservoir extending between a proximal end and a distal end, and the reservoir defining an interior. A basin is mounted to the reservoir. The basin has a basin body and a basin surface. A sleeve assembly has a sleeve body and a port defined in the sleeve body. A tensioner translationally mounts the sleeve body relative to the basin body. The sleeve body translates distally from an accessible position to an occluded position when a weight applied to the sleeve assembly exceeds a weight threshold set by the tensioner. The accessible position includes bird food on the basin surface being accessible through the port. The occluded position includes the port being disposed distal to the basin surface such that the bird food on the basin surface is inaccessible through the port.

18 Claims, 27 Drawing Sheets

(56) References Cited

U.S. PATENT DOCUMENTS

| | | |
|---|---|---|
| 3,051,126 A | 8/1962 | Merritt et al. |
| D193,558 S | 9/1962 | Parry |
| 3,083,687 A | 4/1963 | Slaven |
| 3,145,690 A | 8/1964 | Bachman |
| 3,164,130 A | 1/1965 | Curtis et al. |
| 3,186,379 A | 6/1965 | Grella |
| 3,292,589 A | 12/1966 | Williams |
| D217,470 S | 5/1970 | Morrow |
| 3,648,661 A * | 3/1972 | Moore ................ A01K 39/012 119/53 |
| 4,144,842 A | 3/1979 | Schlising |
| 4,201,155 A | 5/1980 | Hyde, Jr. |
| 4,318,364 A | 3/1982 | Bescherer |
| 4,328,605 A | 5/1982 | Hutchison et al. |
| 4,331,104 A | 5/1982 | Clarke |
| D266,705 S | 10/1982 | Bescherer |
| 4,523,546 A | 6/1985 | Latham |
| 4,541,362 A | 9/1985 | Dehls |
| D285,840 S | 9/1986 | Poon |
| 4,649,865 A | 3/1987 | Riggi |
| 4,712,512 A | 12/1987 | Schreib et al. |
| 4,747,370 A | 5/1988 | Olson |
| 4,821,681 A | 4/1989 | Tucker |
| RE32,970 E | 7/1989 | Furlani |
| 4,892,060 A | 1/1990 | Lundquist |
| D320,097 S | 9/1991 | Vajtay |
| 5,044,319 A | 9/1991 | Blasbalg |
| D326,003 S | 5/1992 | Embree |
| 5,156,112 A | 10/1992 | Brown |
| 5,163,382 A * | 11/1992 | Morrison ........... A01K 39/0113 119/57.9 |
| 5,195,459 A | 3/1993 | Ancketill |
| D335,006 S | 4/1993 | Blasbalg |
| 5,205,065 A | 4/1993 | Wilson et al. |
| 5,191,857 A | 9/1993 | Boaz |
| 5,255,631 A | 10/1993 | Anderson |
| 5,285,748 A | 2/1994 | Weldin |
| 5,309,867 A | 5/1994 | Cruz |
| 5,323,735 A | 6/1994 | Taphorn |
| 5,375,558 A | 12/1994 | Drakos |
| 5,392,732 A | 2/1995 | Fry |
| D359,592 S | 6/1995 | Fenton et al. |
| D360,495 S | 7/1995 | Sanderson |
| 5,445,109 A * | 8/1995 | Gray ................ A01K 39/0113 119/57.9 |
| 5,676,089 A | 10/1997 | Morganson |
| 5,678,507 A | 10/1997 | Kassner |
| 5,690,056 A | 11/1997 | Korb |
| 5,720,238 A | 2/1998 | Drakos |
| 5,826,540 A | 10/1998 | Bridges |
| 5,921,201 A | 7/1999 | Green |
| 5,947,054 A | 9/1999 | Liethen |
| 5,964,183 A | 10/1999 | Czipri |
| D428,437 S | 7/2000 | Hmelar et al. |
| 6,158,385 A | 12/2000 | Boyd |
| 6,253,707 B1 | 7/2001 | Cote |
| D451,251 S | 11/2001 | Chrisco et al. |
| 6,318,290 B1 | 11/2001 | Fisher |
| 6,341,576 B1 | 1/2002 | Cathell et al. |
| 6,408,788 B1 | 6/2002 | Lieb et al. |
| 6,418,878 B1 * | 7/2002 | Cathell ................ A01K 39/0113 119/52.3 |
| 6,532,894 B2 | 3/2003 | Johnson |
| 6,543,383 B1 | 4/2003 | Cote |
| 6,543,384 B2 | 4/2003 | Cote |
| 6,561,128 B1 | 5/2003 | Carter |
| 6,591,781 B2 | 7/2003 | Hardison |
| 6,619,229 B1 | 9/2003 | Lush |
| 6,622,654 B2 | 9/2003 | Fasino |
| 6,640,746 B1 | 11/2003 | Lund |
| D488,590 S | 4/2004 | Fort, II |
| D490,576 S | 5/2004 | Rich et al. |
| 6,843,204 B2 | 1/2005 | Peltier |
| 6,863,024 B1 | 3/2005 | Obenshain |
| 6,889,629 B2 | 5/2005 | Swift et al. |
| 6,918,353 B1 | 7/2005 | Coroneos |
| 6,945,192 B2 | 9/2005 | Cote |
| 6,951,188 B1 | 10/2005 | Lush |
| 6,986,322 B2 | 1/2006 | Lumpkin |
| D515,748 S | 2/2006 | Jung et al. |
| 7,032,539 B1 | 4/2006 | Obenshain |
| D524,490 S | 7/2006 | Obenshain |
| 7,131,395 B1 | 11/2006 | Lush |
| D535,445 S | 1/2007 | Obenshain |
| 7,162,972 B2 | 1/2007 | Stachowiak |
| 7,191,731 B2 | 3/2007 | Cote |
| D539,991 S | 4/2007 | Petrie et al. |
| 7,219,621 B2 | 5/2007 | Coroneos |
| 7,258,075 B1 | 8/2007 | Jones et al. |
| 7,263,950 B2 | 9/2007 | Swift et al. |
| 7,305,936 B2 | 12/2007 | Tippetts |
| 7,347,162 B2 | 3/2008 | Zieff et al. |
| 7,370,607 B2 | 5/2008 | O'Dell |
| D572,866 S | 7/2008 | Bloedorn |
| 7,448,346 B1 | 11/2008 | Stone et al. |
| 7,516,715 B2 | 4/2009 | Conlon |
| 7,540,260 B2 | 6/2009 | Rich et al. |
| D612,108 S | 3/2010 | Torres et al. |
| 7,721,676 B2 | 5/2010 | Bloedorn |
| 7,739,982 B2 | 6/2010 | Cote |
| 8,056,507 B2 | 11/2011 | Lush |
| 8,230,809 B2 | 7/2012 | Cote |
| D671,692 S | 11/2012 | Carter |
| D677,016 S | 2/2013 | Carter |
| D678,627 S | 3/2013 | Carter |
| D679,059 S | 3/2013 | Carter |
| 8,413,605 B2 | 4/2013 | Baynard |
| 8,434,425 B2 | 5/2013 | Cote |
| D692,191 S | 10/2013 | Stephens et al. |
| 8,662,016 B2 | 3/2014 | Lush |
| D709,249 S | 7/2014 | Van Dyk et al. |
| 8,807,081 B1 | 8/2014 | Gage et al. |
| D723,226 S | 2/2015 | Krueger |
| D725,316 S | 3/2015 | Carter |
| 8,978,586 B1 | 3/2015 | Carter et al. |
| 9,179,649 B2 | 11/2015 | Carter et al. |
| 9,192,147 B2 | 11/2015 | Hoysak |
| D745,227 S | 12/2015 | Thorn |
| 9,277,735 B2 | 3/2016 | Murray |
| 9,282,727 B2 | 3/2016 | Cote |
| 9,320,263 B2 | 4/2016 | Cote |
| D811,013 S | 2/2018 | Thorn |
| D817,556 S | 5/2018 | Thorn |
| 10,130,079 B2 | 11/2018 | Cote |
| D851,842 S | 6/2019 | Nifong et al. |
| 10,314,294 B2 | 6/2019 | Thorn |
| 10,531,644 B2 * | 1/2020 | Cote ................ A01K 39/0113 |
| 2002/0139311 A1 * | 10/2002 | Cote ................ A01K 39/0113 119/57.9 |
| 2002/0152965 A1 * | 10/2002 | Turner ............... A01K 39/0125 119/53 |
| 2002/0157615 A1 * | 10/2002 | Laske, Jr. ........... A01K 39/012 119/57.8 |
| 2003/0127056 A1 | 7/2003 | Chrisco et al. |
| 2003/0136347 A1 * | 7/2003 | Fasino ................ A01K 39/0113 119/57.9 |
| 2003/0226514 A1 * | 12/2003 | Cote ................ A01K 39/0113 119/57.9 |
| 2004/0216684 A1 | 11/2004 | Obenshain |
| 2004/0250777 A1 | 12/2004 | Stachowiak |
| 2005/0263083 A1 * | 12/2005 | Coroneos ........... A01K 39/0113 119/57.1 |
| 2006/0266295 A1 | 11/2006 | McDarren |
| 2006/0272585 A1 | 12/2006 | O'Dell |
| 2006/0288944 A1 | 12/2006 | Hoff |
| 2007/0227453 A1 | 10/2007 | Puckett et al. |
| 2007/0266950 A1 | 11/2007 | Walsh |
| 2007/0266951 A1 | 11/2007 | Berns |
| 2008/0022936 A1 | 1/2008 | Stone et al. |
| 2008/0078329 A1 | 4/2008 | Hunter et al. |
| 2008/0083375 A1 | 4/2008 | Stephanian |
| 2008/0105206 A1 | 5/2008 | Rich et al. |
| 2008/0210172 A1 * | 9/2008 | Waikas ............... A01K 39/0113 119/52.3 |

(56) References Cited

U.S. PATENT DOCUMENTS

| | | |
|---|---|---|
| 2009/0071408 A1 | 3/2009 | Wechsler |
| 2009/0260576 A1 | 10/2009 | Vosbikian |
| 2009/0304900 A1 | 12/2009 | Augustin |
| 2010/0061091 A1 | 3/2010 | Galipeau et al. |
| 2010/0258055 A1* | 10/2010 | Cote .................. A01K 39/0113 119/52.3 |
| 2010/0269756 A1* | 10/2010 | Trout ................ A01K 39/0113 119/52.3 |
| 2010/0288200 A1 | 11/2010 | Lush |
| 2010/0288201 A1 | 11/2010 | Lush |
| 2011/0083609 A1 | 4/2011 | Cote |
| 2011/0083610 A1* | 4/2011 | Cote .................. A01K 39/0113 119/52.3 |
| 2011/0088626 A1 | 4/2011 | Hepp et al. |
| 2011/0126771 A1* | 6/2011 | Cote .................. A01K 39/0113 119/52.3 |
| 2011/0174233 A1 | 7/2011 | Lush |
| 2012/0234249 A1 | 9/2012 | Gaze |
| 2013/0174789 A1 | 7/2013 | Koski |
| 2014/0060438 A1* | 3/2014 | Cote .................. A01K 39/0113 119/51.01 |
| 2014/0090600 A1 | 4/2014 | Hoysak |
| 2014/0360435 A1 | 12/2014 | Cote |
| 2015/0136032 A1 | 5/2015 | Cote |
| 2015/0305311 A1* | 10/2015 | Murray ................ A01K 39/012 119/57.9 |
| 2016/0113247 A1* | 4/2016 | McCord ............ A01K 39/0113 119/52.3 |
| 2016/0165856 A1 | 6/2016 | Hoysak |
| 2016/0262357 A1* | 9/2016 | Cole .................. A01K 39/0113 |
| 2016/0366319 A1 | 12/2016 | Perkins |
| 2017/0164585 A1* | 6/2017 | Cote .................. A01K 39/0106 |
| 2017/0172112 A1* | 6/2017 | Thorn .................. A01K 39/012 |
| 2017/0231202 A1 | 8/2017 | Cote |
| 2017/0245474 A1 | 8/2017 | Biggin |
| 2017/0339926 A1* | 11/2017 | Cote .................... A01K 39/012 |
| 2017/0339927 A1* | 11/2017 | Cote .................... A01K 39/012 |
| 2019/0166804 A1 | 6/2019 | Bartholow |
| 2019/0313608 A1* | 10/2019 | Cote .................... A01K 39/012 |

OTHER PUBLICATIONS

"Belle Fleur Wild Bird Products Catalog," Hiatt Manufacturing Incorporated, Catalog No. 1, 2013, 16 pages.
"Belle Fleur Wild Bird Products Catalog," Hiatt Manufacturing, Incorporated, Catalog No. 2, 2011, 16 pages.
Droll Yankees, "Product Catalog: The World's Best Bird Feeders and More Since 1969," 2008, 36 pages.
More Birds, "Bird Feeders & Nectar New Product Catalog Supplement," Classic Brands, 2014, 4 pages.
More Birds, "Bird Feeders & Nectar Product Catalog," Classic Brands, 2013, 12 pages.
More Birds, "Bird Feeders & Nectar Product Catalog," Classic Brands, 2015, 16 pages.
More Birds, "Product Catalog: Bird Feeders and Nectar," Classic Brands LLC, 2010-2012, 6 pages.
"Squirrel Buster Peanut and Brochure," Brome Bird Care, 2007, 2 pages.
Stokes, "Select Bird Feeders & Accessories Products Catalog," Hiatt Manufacturing, 2010, 17 pages.
Stokes, "Select Bird Feeders & Accessories Products Catalog," Hiatt Manufacturing, Inc., 2011, 36 pages.
Stokes, "New Products Supplemental Products Catalog," Hiatt Manufacturing, 2014, 4 pages.
Stokes, "New Products Supplemental Products Catalog," Hiatt manufacturing, 2015, 8 pages.
Stokes, "Stokes Select Bird Feeders & Accessories Products Catalog," Hiatt Manufacturing, Inc., 2013, 46 pages.

* cited by examiner

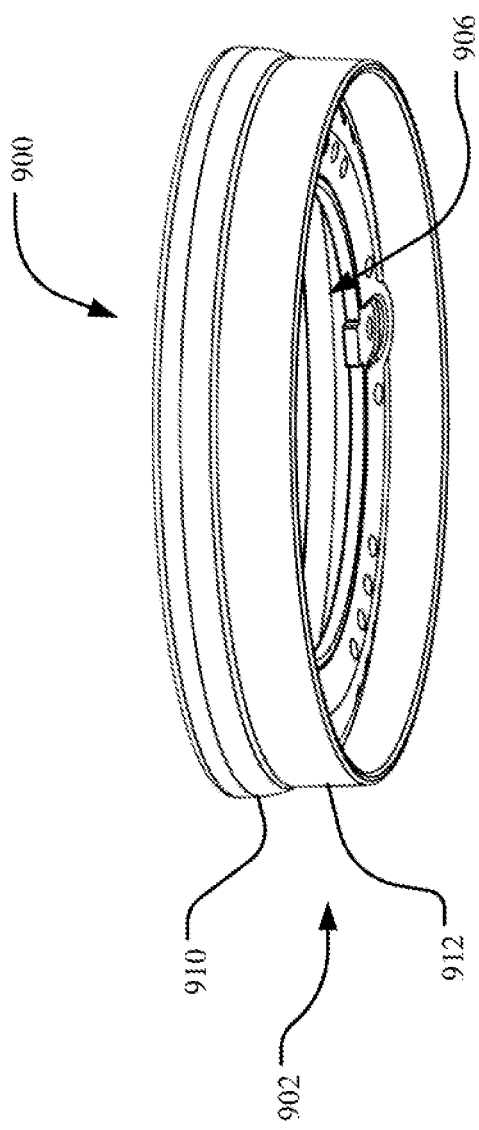
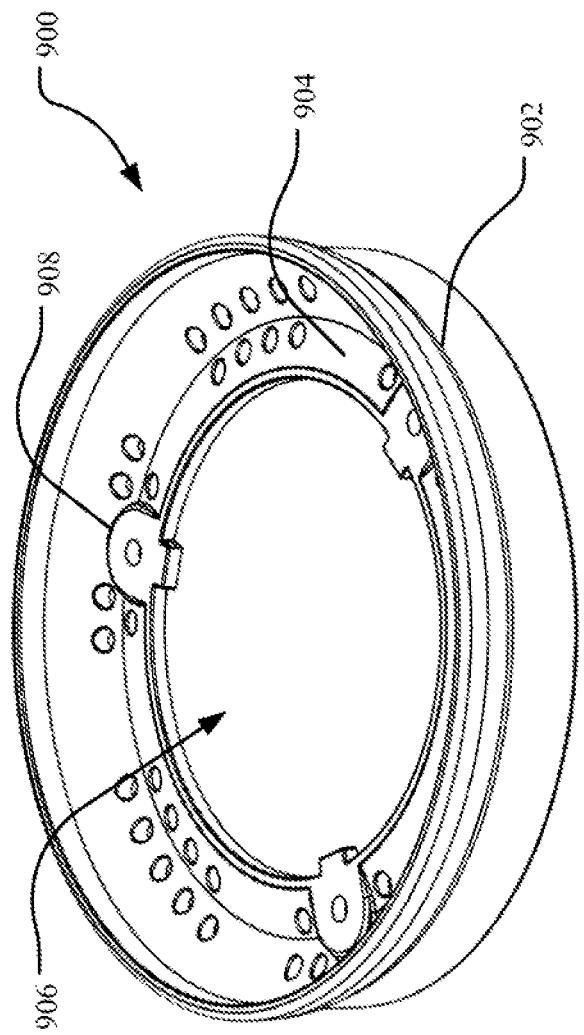
FIG. 18B
FIG. 18A

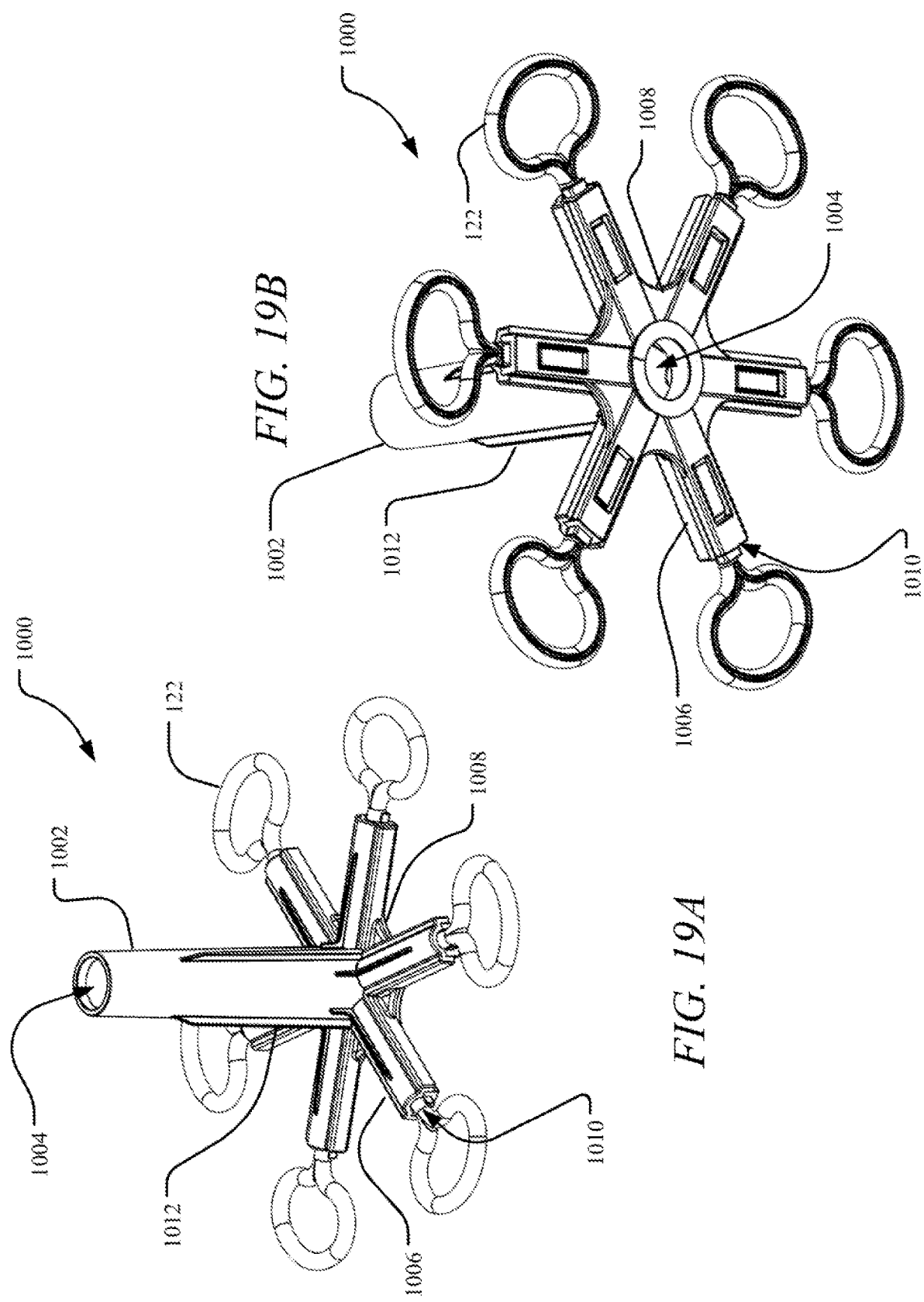

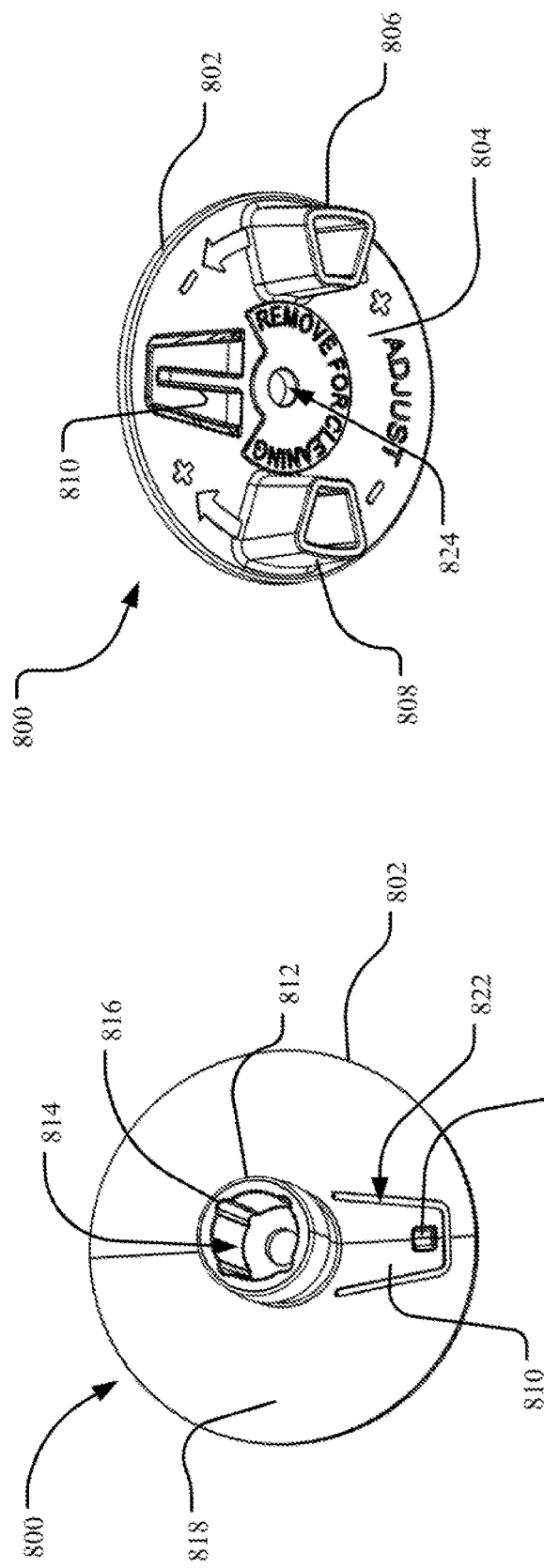
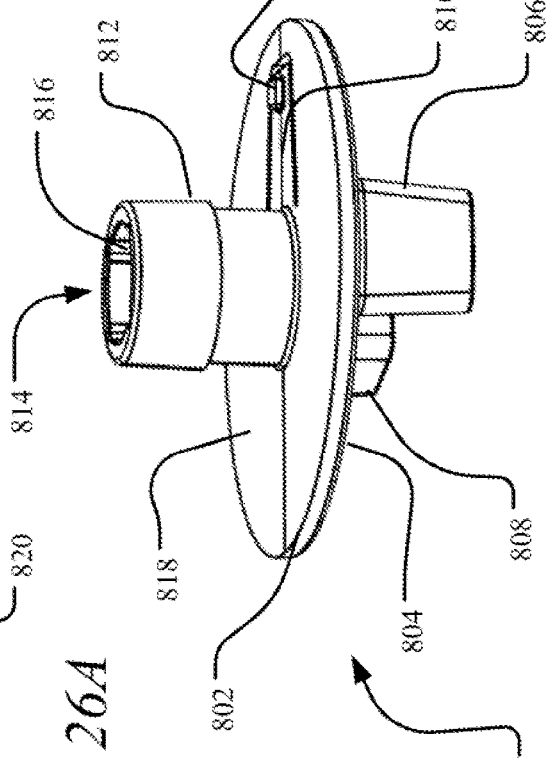

PEST RESISTANT BIRD FEEDER

CROSS-REFERENCE TO RELATED APPLICATIONS

The present application is a continuation-in-part of and claims priority to U.S. Design application Ser. No. 29/627,598, entitled "Bird Feeder" and filed Nov. 28, 2017, which is incorporated by reference in its entirety herein.

FIELD

Aspects of the present disclosure relate generally to resistance to intrusion by pests, such as squirrels or large birds, into a supply of bird food in a bird feeder.

BACKGROUND

Attracting wild birds, particularly song birds, using bird feeders is an increasingly popular hobby. The ability to attract desired birds may be limited, however, where the area in which the bird feeder is stationed is frequented by pests, such as squirrels and larger birds including magpies. Many conventional bird feeders are susceptible to such pests accessing and consuming bird food in the bird feeder, thereby discouraging wild birds from visiting the bird feeder and greatly increasing the costs associated with the hobby by having to replace the consumed bird food in shorter intervals. These challenges are exacerbated in attempting to distinguish between wild birds and pests, such as squirrels, to ensure that the bird food is not denied to the wild birds. It is with these observations in mind, among others, that various aspects of the present disclosure were conceived and developed.

SUMMARY

Implementations described and claimed herein address the foregoing problems by providing systems and methods for resisting intrusion by a pest. In one implementation, a reservoir extends between a proximal end and a distal end, and the reservoir defines an interior. A basin is mounted to the reservoir. The basin has a basin body and a basin surface. A sleeve assembly has a sleeve body and a port defined in the sleeve body. A tensioner translationally mounts the sleeve body relative to the basin body. The sleeve body translates distally from an accessible position to an occluded position when a weight applied to the sleeve assembly exceeds a weight threshold set by the tensioner. The accessible position includes bird food on the basin surface being accessible through the port. The occluded position includes the port being disposed distal to the basin surface such that the bird food on the basin surface is inaccessible through the port.

In another implementation, a reservoir extends between a proximal end and a distal end, and the reservoir defines an interior. A dispenser is mounted to the distal end of the reservoir. The dispenser has a cavity. A basin has a basin body and a basin surface, and the basin mounted to the dispenser. At least one dispensing surface is disposed relative to the dispenser and the basin surface. Bird food is dispensable through a dispensing opening from the cavity onto the basin surface using the at least one dispensing surface. A sleeve assembly has a sleeve body and a port defined in the sleeve body. A tensioner translationally mounts the sleeve body relative to the basin body. The sleeve body translates distally from an accessible position to an occluded position when a weight applied to the sleeve assembly exceeds a weight threshold set by the tensioner. The accessible position includes the bird food on the basin surface being accessible through the port. The occluded position includes the port being disposed distal to the basin surface such that the bird food on the basin surface is inaccessible through the port. An adjuster controls the weight threshold set by the tensioner. The adjuster is disposed exterior to the sleeve assembly. An indicator is disposed in the interior of and visible through the reservoir, and the indicator provides a visual reference of the weight threshold.

In still another implementation, input is received at an adjuster. The input controls a weight threshold set by a tensioner. The adjuster is accessible from an exterior of a bird feeder. A visual reference of the weight threshold is displayed using an indicator, and the visual reference visible from the exterior of the bird feeder. An application of a weight of the pest exceeding the weight threshold is received on a sleeve assembly of the bird feeder. The sleeve assembly has a port defined in a sleeve body. The sleeve assembly is translated distally relative to a basin in response to the application of the weight of the pest. The basin has a basin body and a basin surface. The sleeve assembly is translated from an accessible position to an occluded position. The accessible position includes bird food on the basin surface being accessible through the port, and the occluded position includes the port being disposed distal to the basin surface such that the bird food on the basin surface is inaccessible through the port.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIGS. 18A and 18B show top perspective and side perspective views, respectively, of an example basin.

FIGS. 19A and 19B depict top perspective and bottom perspective views, respectively, of an example perch mount assembly.

FIGS. 26A, 26B, and 26C illustrate top, side perspective, and bottom perspective views of an example tensioner.

DETAILED DESCRIPTION

Aspects of the presently disclosed technology relate to systems and methods for resisting intrusion by a pest, such as a squirrel, scavenger bird, and/or the like. In one aspect, a bird feeder includes a basin fixed relative to a reservoir. The basin includes a basin body and a basin surface. Bird food, such as seed, nuts, and/or the like, is directed from an interior of the reservoir onto the basin surface. For example, the bird feeder may include a dispenser that directs the bird food through a dispensing opening using one or more dispensing surfaces. A sleeve assembly is translationally mounted relative to the basin with a tensioner.

The tensioner is used to set a weight threshold corresponding to pests for which to prevent access to the bird food. For example, the weight threshold is set above a typical weight of wild birds to attract and at or below a typical weight of pests, which often weigh more than the wild birds. The weight threshold is set or otherwise controlled using an adjuster that is accessible from outside the bird feeder, such that the bird feeder does not have to be disassembled to make adjustments to the weight threshold. To further facilitate such adjustments, and indicator is visible from an exterior of the bird feeder to provide a visual reference of the weight threshold and any adjustments made. For example, the indicator may move proximally and distally in coordination with an increase and decrease in tension of the tensioner. The change in tension adjusts the weight threshold accordingly.

The weight threshold generally acts as a trigger for initiating pest resisting mechanisms. More particularly, in an absence of an application of weight to the sleeve assembly and when the application of weight is below the weight threshold (e.g., when one or more wild birds are seated on a perch of the sleeve assembly), the sleeve assembly remains in an accessible position. Stated differently, the tensioner biases the sleeve assembly into the accessible position. In this position, the bird food on the basin surface is accessible through one or more ports defined in the sleeve assembly. When the weight of a pest is applied to the sleeve assembly that exceeds the weight threshold, the bias of the tensioner is overcome, and the sleeve assembly translates distally from the accessible position to an occluded position. In this position, the bird food on the basin surface is inaccessible through the one or more ports, and the pest is therefore unable to obtain the bird food. When the weight of the pest is removed from the sleeve assembly, the bias of the tensioner causes the sleeve assembly to translate proximally from the occluded position to the accessible position.

Figure 1:
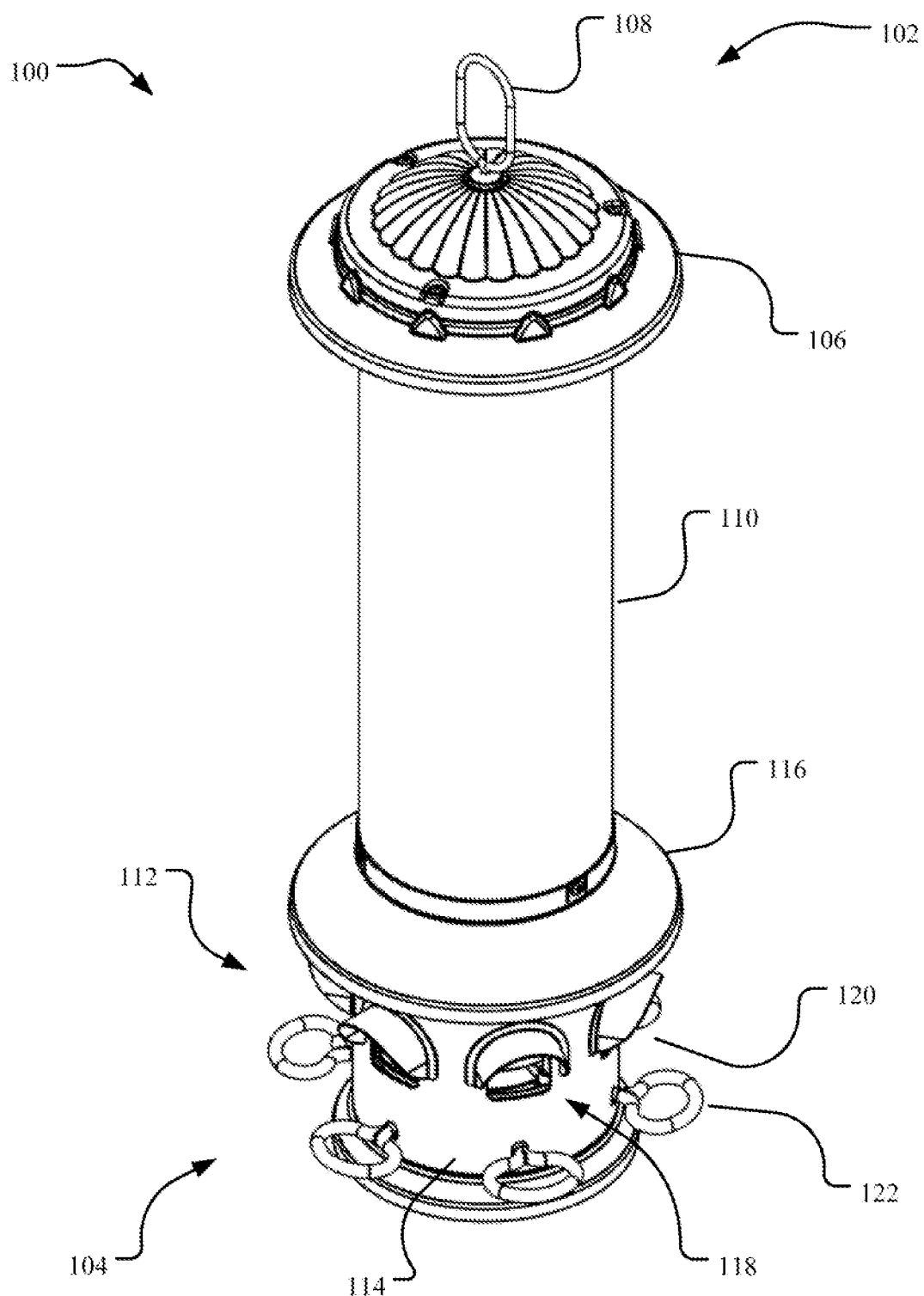
FIG. 1 shows an isometric view of an example bird feeder that is resistant to intrusion by a pest.

To begin a detailed description of an example bird feeder 100 that is resistant to intrusion by a pest, reference is made to FIG. 1. In one implementation, the bird feeder 100 extends between a proximal end 102 and a distal end 104. A cap assembly 106 is disposed at the proximal end 102 and includes a hanger 108 for suspending the bird feeder 100. For example, the hanger 108 may be used to suspend the bird feeder 100 from a tree limb, pole, post, beam, or other structure.

Figure 2:
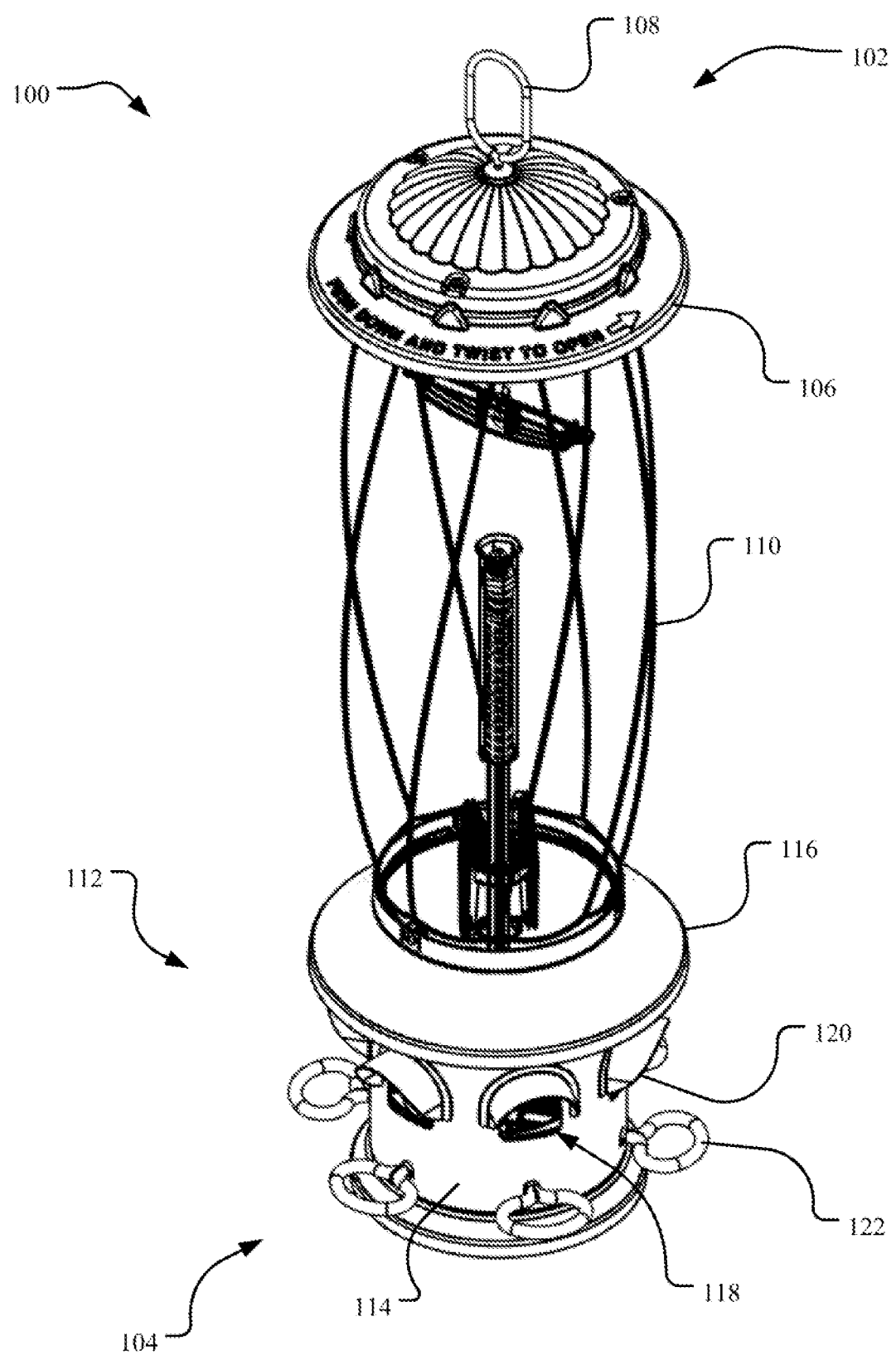
FIG. 2 illustrates the bird feeder having a reservoir with different ornamental features.

In one implementation, a reservoir 110 extends distally from the cap assembly 106 to a base assembly 112 disposed at the distal end 104 of the bird feeder 100. The reservoir 110 includes a wall defining an interior housing bird food. In one implementation, the reservoir 110 includes an opening at the proximal end 102 through which bird food is inserted into the interior of the reservoir 110. The opening into the interior of the reservoir 110 is removably covered with the cap assembly 106. As can be understood from FIGS. 1 and 2, the bird feeder 100 may include various ornamental features. Examples of different ornamental features of the reservoir 110 are illustrated in FIGS. 1 and 2. It will be appreciated, however, that the bird feeder 100 may include various other ornamental features, including, but not limited to, the cap assembly 106, the reservoir 110, the base assembly 112, and/or the like.

In one implementation, the base assembly 112 includes a sleeve assembly 114 translationally mounted relative to the reservoir 110. Stated differently, the sleeve assembly 114 is adapted to move proximally and distally along a longitudinal axis of the bird feeder 100 relative to the reservoir 110. The sleeve assembly 114 translates in response to an application or removal of weight to at least a portion of the sleeve assembly 114. For example, the sleeve assembly 114 is biased into an accessible position and will translate distally in a direction away from the reservoir 110 into an occluded position if a weight applied to at least a portion of the sleeve assembly 114 exceeds a weight threshold. When the application of weight exceeding the weight threshold is removed, the sleeve assembly 114 translates proximally in a direction towards the reservoir 110, returning the sleeve assembly 114 into the accessible position.

The sleeve assembly 114 moves in harmony as a single unit relative to a reservoir assembly. In one implementation, the sleeve assembly 114 includes one or more ports 118, each with a port hood 120 and a perch 122 disposed relative to the port 118. For example, each of the ports 118 may include a port hood 120 disposed proximal to the port 118 and a perch 122 disposed distal to the port 118. In the accessible position, wild birds may access the bird food through the ports 118, for example, while being seated on one of the perches 122. The translation of the sleeve assembly 114 restricts access to the bird food when a pest applies weight to at least a portion of the sleeve assembly 114.

To further restrict access to the bird food, the base assembly 112 includes a shield 116. The shield 116 may be fixed to the reservoir 110, such that the reservoir assembly includes the cap assembly 106, the reservoir 110, and the shield 116, among other internal components. The shield 116 acts as a barrier to the sleeve assembly 114, preventing a pest from applying weight to the reservoir assembly and reaching distally into one of the ports 118. Stated differently, if a pest were to apply its weight to the reservoir assembly only, the sleeve assembly remains in the accessible position, with the bird food accessible to the pest. As such, the shield 116 acts as a barrier preventing the pest from accessing the bird food in this arrangement. The port hoods 120 may serve as a further barrier to the ports 118. The shield 116 and port hoods 120 may further provide protection to the wild birds while feeding.

Figure 3:
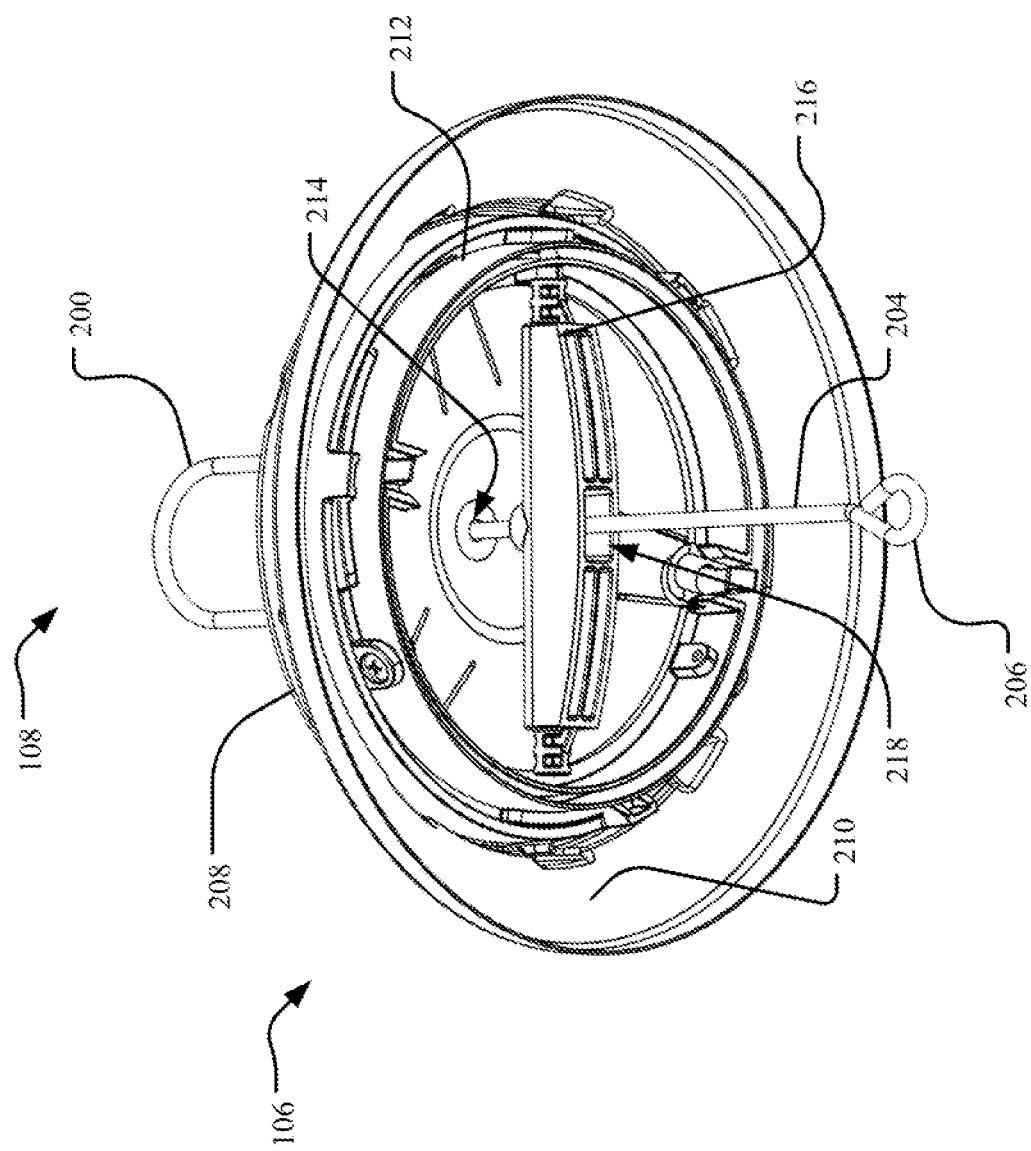
FIG. 3 is a bottom perspective view of an example cap assembly.
Figure 4:
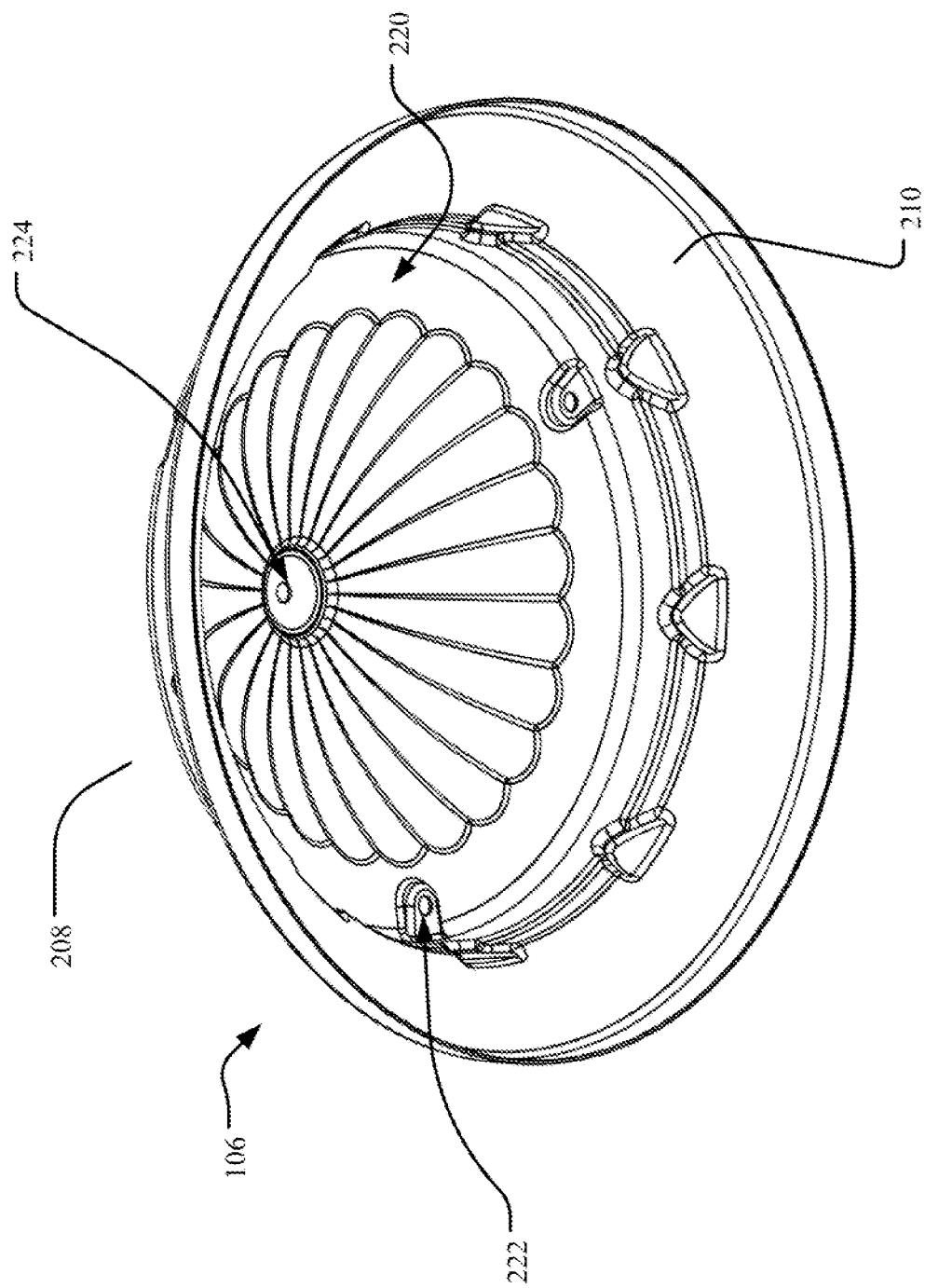
FIG. 4 depicts a bottom perspective view of an example cap.
Figure 5:
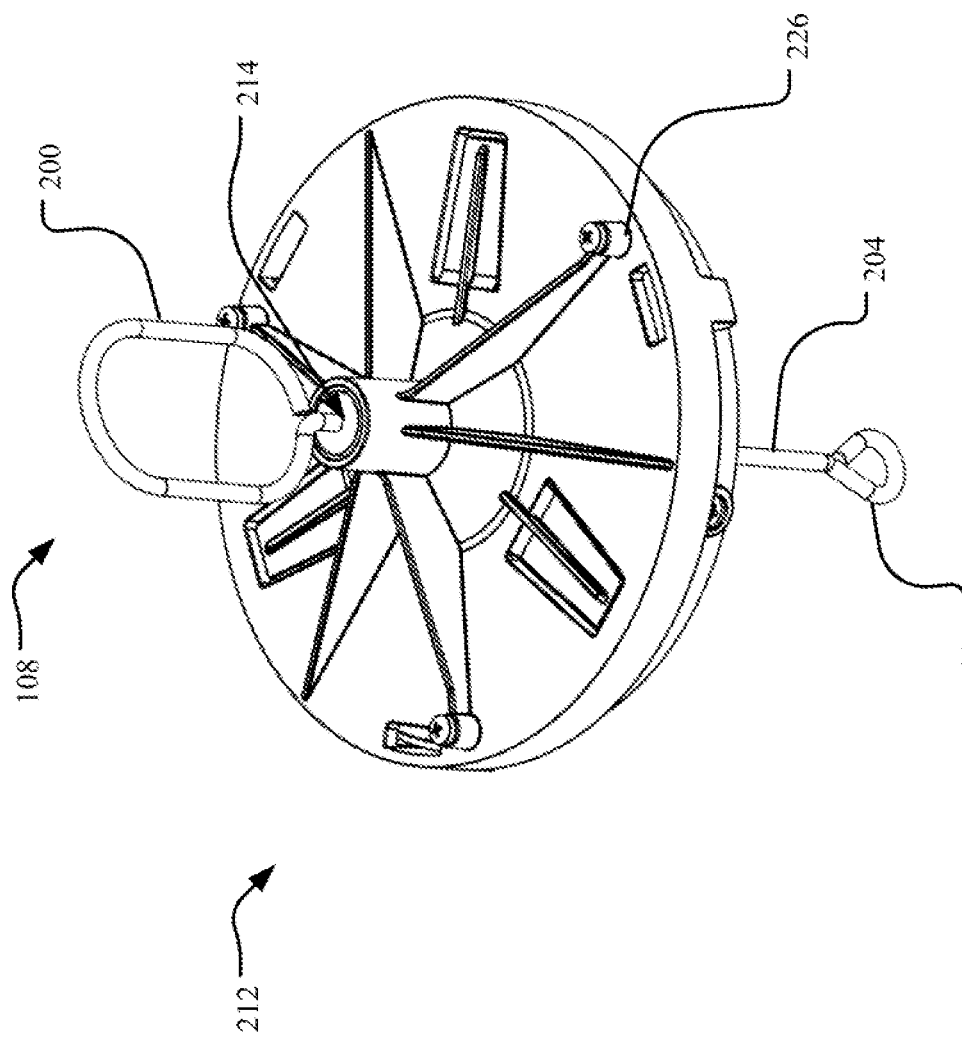
FIG. 5 shows a top perspective view of an example cap lock.

Referring to FIGS. 3-5, in one implementation, the hanger 108 includes a hanger body 204 extending between a proximal end 200 and a distal end 206. Each of the proximal end 200 and the distal end 206 may be in the form of or otherwise include a loop, hook, and/or the like. The hanger body 204 extends through and is translatable relative to the cap assembly 106. In one implementation, to facilitate disassembly, cleaning, suspension, and other actions, the hanger 108 is unattached from any other components of the bird feeder 100. Stated differently, in this arrangement, the hanger 108 is exclusively attached to the cap assembly 106 and is translatable with respect thereto. It will be appreciated, however, that the hanger 108 may be fixed or connected in various manners to other components.

In one implementation, the cap assembly 106 includes a cap 208 having an inner surface 210 defining a cap cavity 220. The cap 208 may be releasably connectable with the proximal end of the reservoir 110 to cover the opening into the interior. In one implementation, a cap lock 212 having reservoir locking ring is attached to the inner surface 210 and disposed within the cap cavity 220. For example, the cap 208 may have one or more cap connectors 222 connected to corresponding lock connectors 226. A hanger bar 216 extends between the reservoir locking ring of the cap lock 212 to translationally mount the hanger 108 to the cap assembly 106. More particularly, in one implementation, the hanger body 204 extends through a cap opening 224 in the cap 208, a lock opening 214 in the cap lock 212, and a bar opening 218 of the hanger bar 216. In this arrangement, the proximal end 200 and the distal end 206 of the hanger 108 each act as a stop to prevent the hanger body 204 from disconnecting from the cap assembly 106. The hanger body 204 is permitted to translate within each of the openings 224, 214, and 218. However, the proximal end 200 cannot translate through the cap opening 224, and the distal end 206 cannot translate through the bar opening 218.

Figure 6:
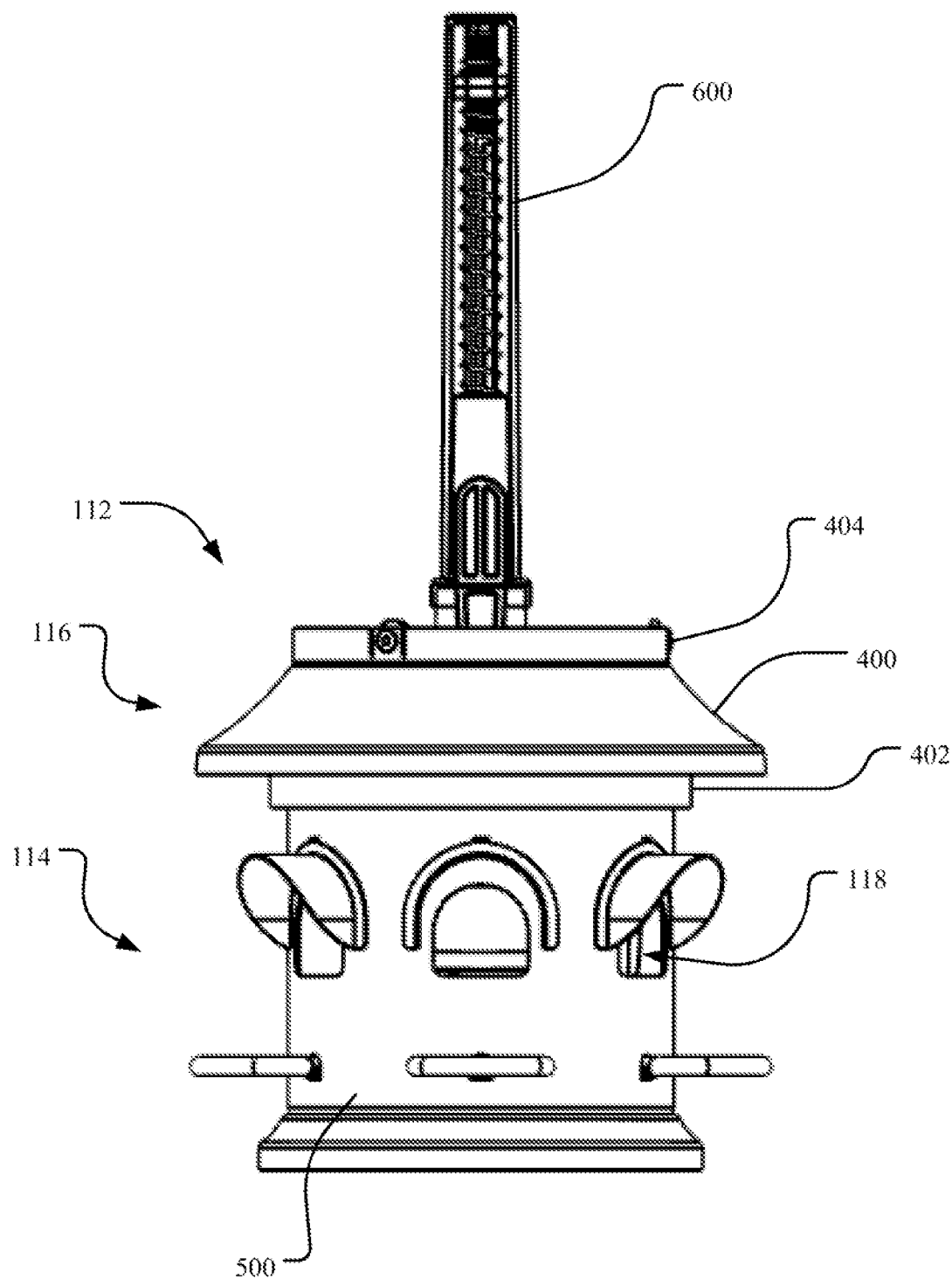
FIG. 6 illustrates a side view of a base assembly.
Figure 7:
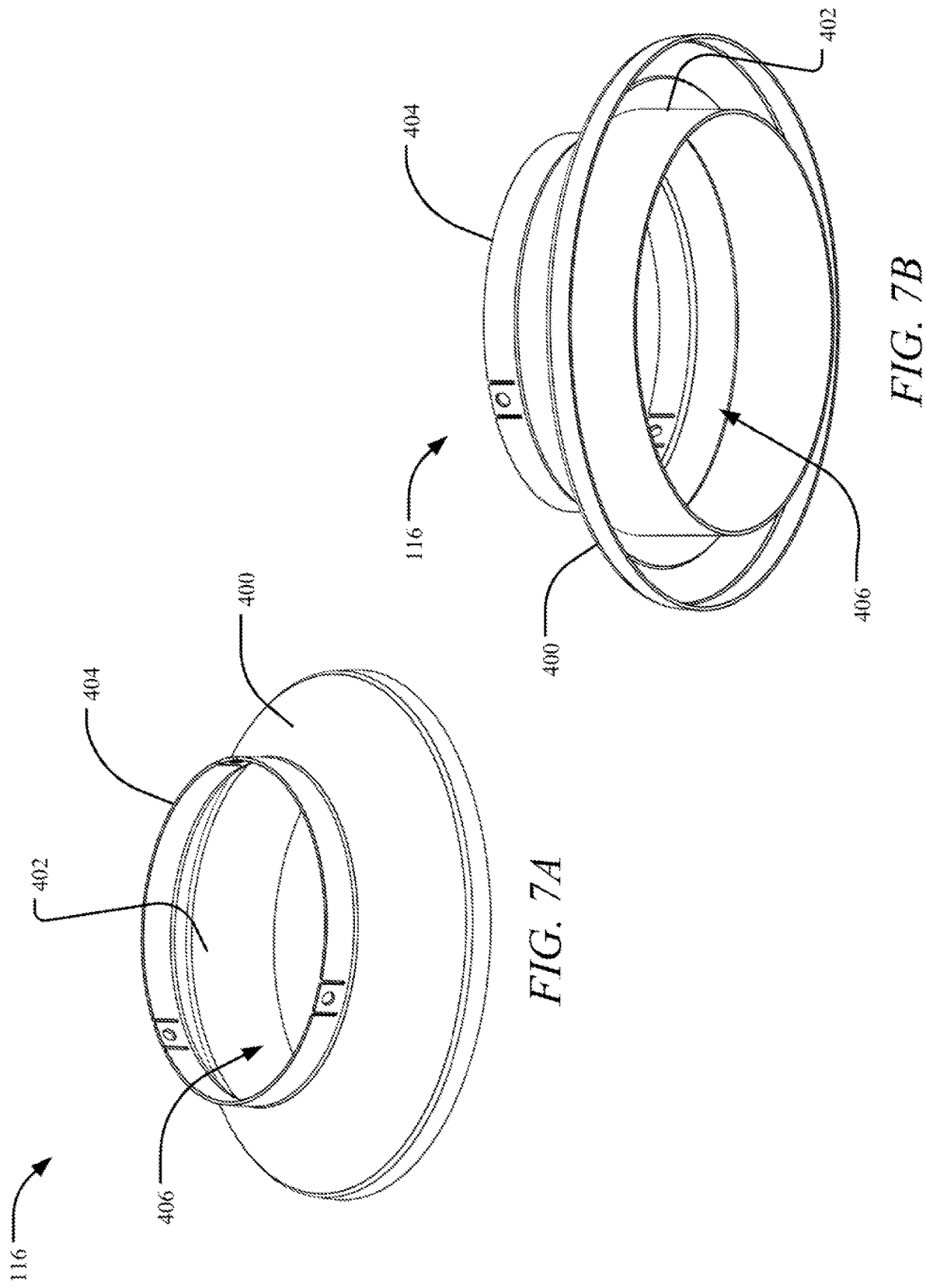
FIGS. 7A and 7B depict top perspective and bottom perspective views, respectively, of an example shield.

Turning to FIGS. 6-7B, in one implementation, the base assembly 112 includes a tensioner 600 translationally mounting the sleeve assembly 114 to the reservoir assembly, which may include the shield 116 fixed to the reservoir 110. In one implementation, the shield 116 includes a shield body 400 extending distally and radially outwardly from a shield locking ring 404. The distal end of the reservoir 110 may be mounted to the shield locking ring 404. A distal shield body 402 extends distally from an inner surface of the shield body 400. In one implementation, the distal shield body 402 is indented from an edge of the shield body 400, such that the distal shield body 402 is positioned radially inwardly from an outer circumference of the shield body 400.

A shield opening 406 extends through the shield 116 from the shield locking ring 404 to the distal shield body 402.

Figure 8:
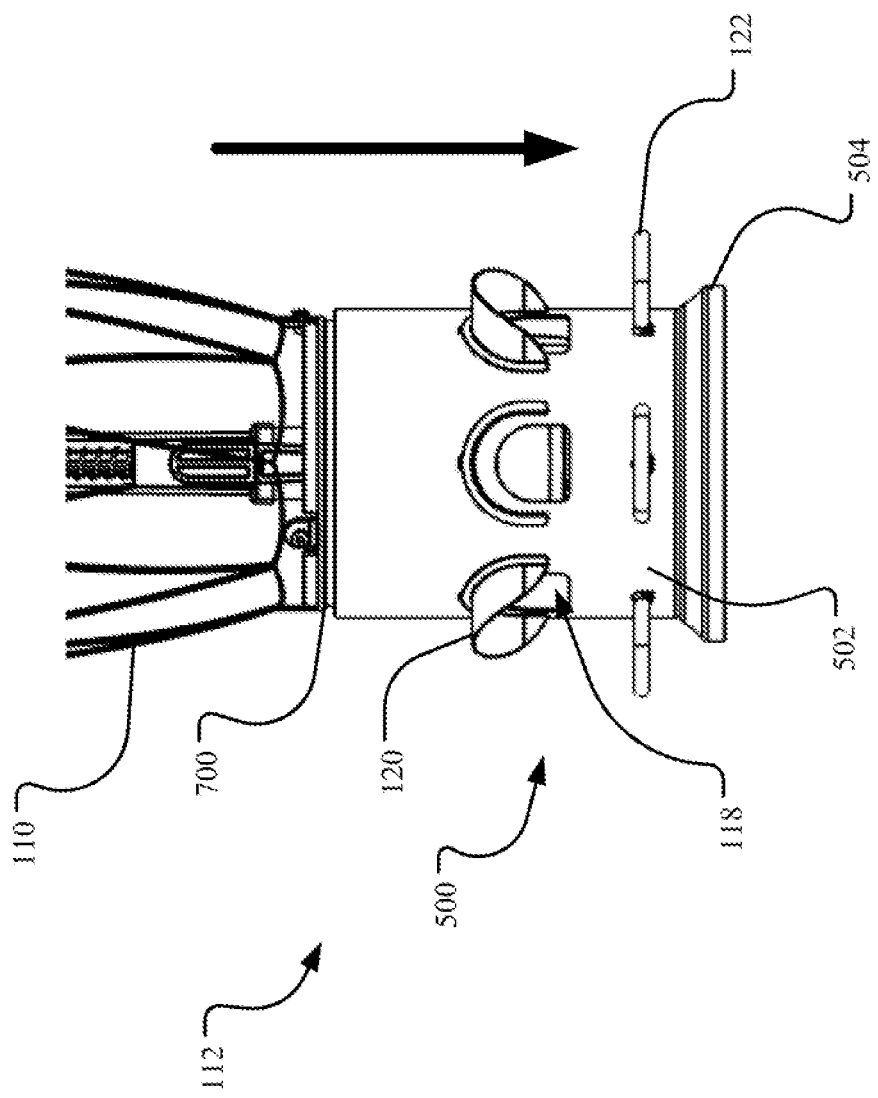
FIG. 8 illustrates a side view of the base assembly with the shield removed.

Referring to FIGS. 7A-8, in one implementation, an inner edge of the shield locking ring 404 is offset from the distal shield body 402 to provide a shelf separating the reservoir 110 and a sleeve 500 of the sleeve assembly 114. The shelf may further prevent the sleeve 500 from translating proximally past the accessible position. As described herein, the sleeve assembly 114 is translatable distally from the accessible position shown in FIG. 8 in a direction away from the reservoir 110, as indicated by the arrow, into the occluded position. In one implementation, an entirety of the sleeve assembly 114, including a sleeve body 502 of the sleeve 500, a sleeve base 504 of the sleeve 500, the perches 122, the ports 118, and the port hoods 120 translates in harmony.

Figure 9:
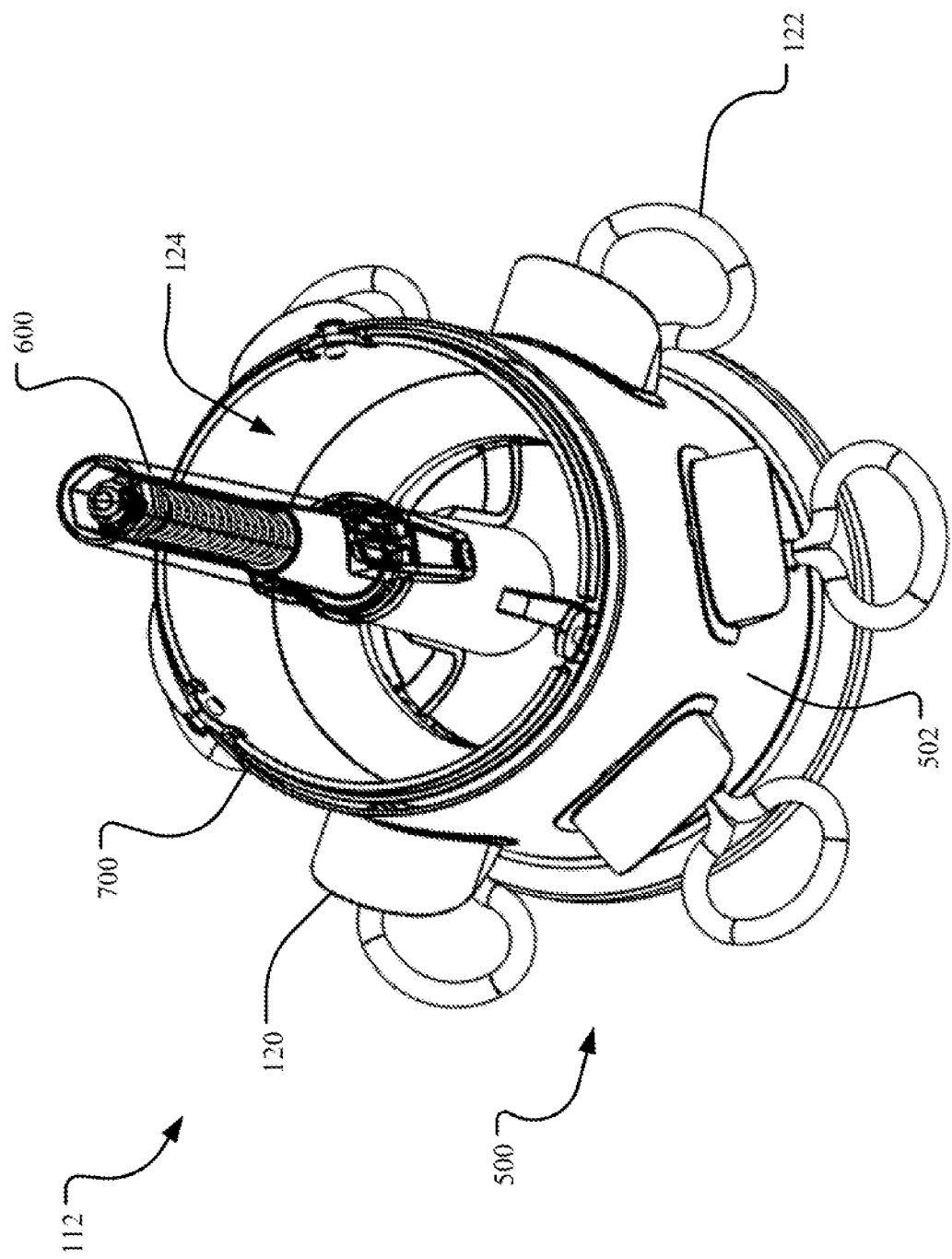
FIGS. 9 and 10 show top perspective and bottom perspective views, respective, of the base assembly with the shield removed.
Figure 10:
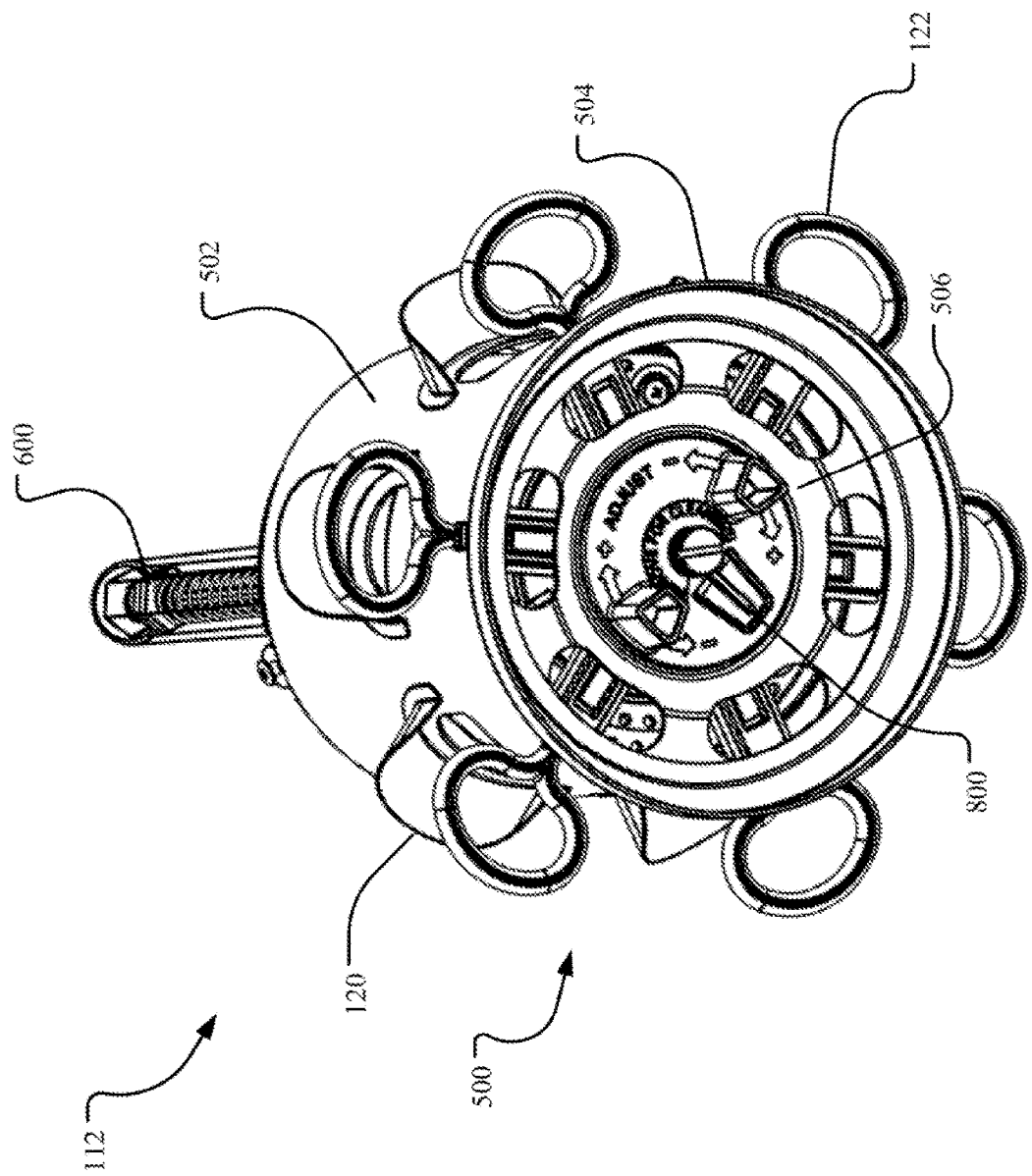

As can be understood from FIGS. 9-10, in one implementation, the base assembly 112 includes a cavity 124 in communication with the interior of the reservoir 110 for receiving bird food from the interior of the reservoir 110 and directing it for dispensing. The cavity 124 may be defined, at least in part, by a dispenser 700 positioned within the sleeve assembly 114. In one implementation, the tensioner 600 is mounted within the cavity 124 and extends proximally into the interior of the reservoir 110. An adjuster 800 is positioned outside of the sleeve 500 or is otherwise accessible from an exterior of the base assembly 112. For example, the adjuster 800 may be positioned on or otherwise accessible through a sleeve distal end 506 of the sleeve 500 at the distal end 104 of the bird feeder 100.

Figure 11:
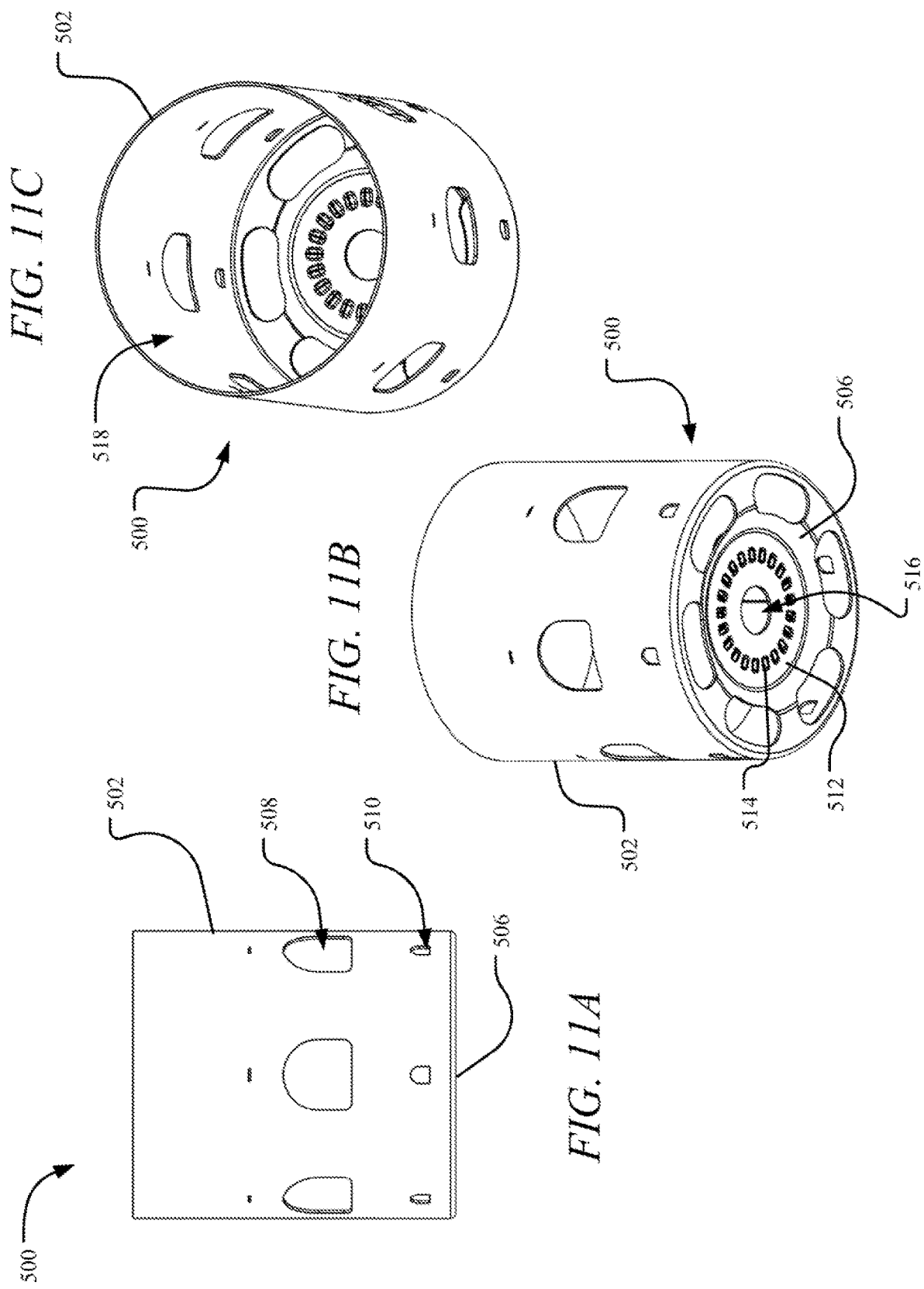
FIGS. 11A, 11B, and 11C depict side, bottom perspective, and top perspective views, respectively, of an example sleeve.
Figure 12:
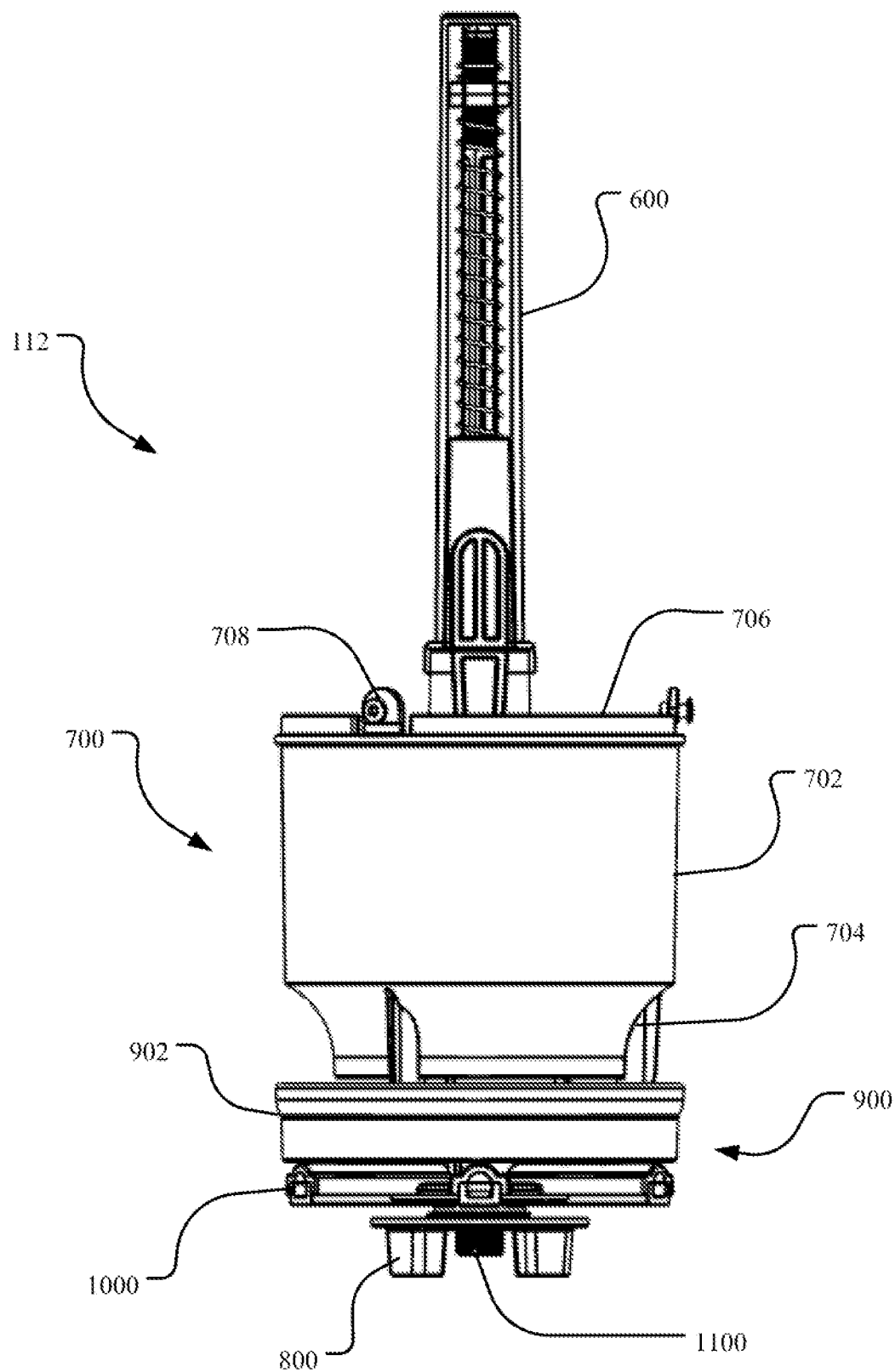
FIGS. 12 and 13 show side and top perspective views, respectively, of a base assembly with the shield and sleeve assembly removed.
Figure 13:
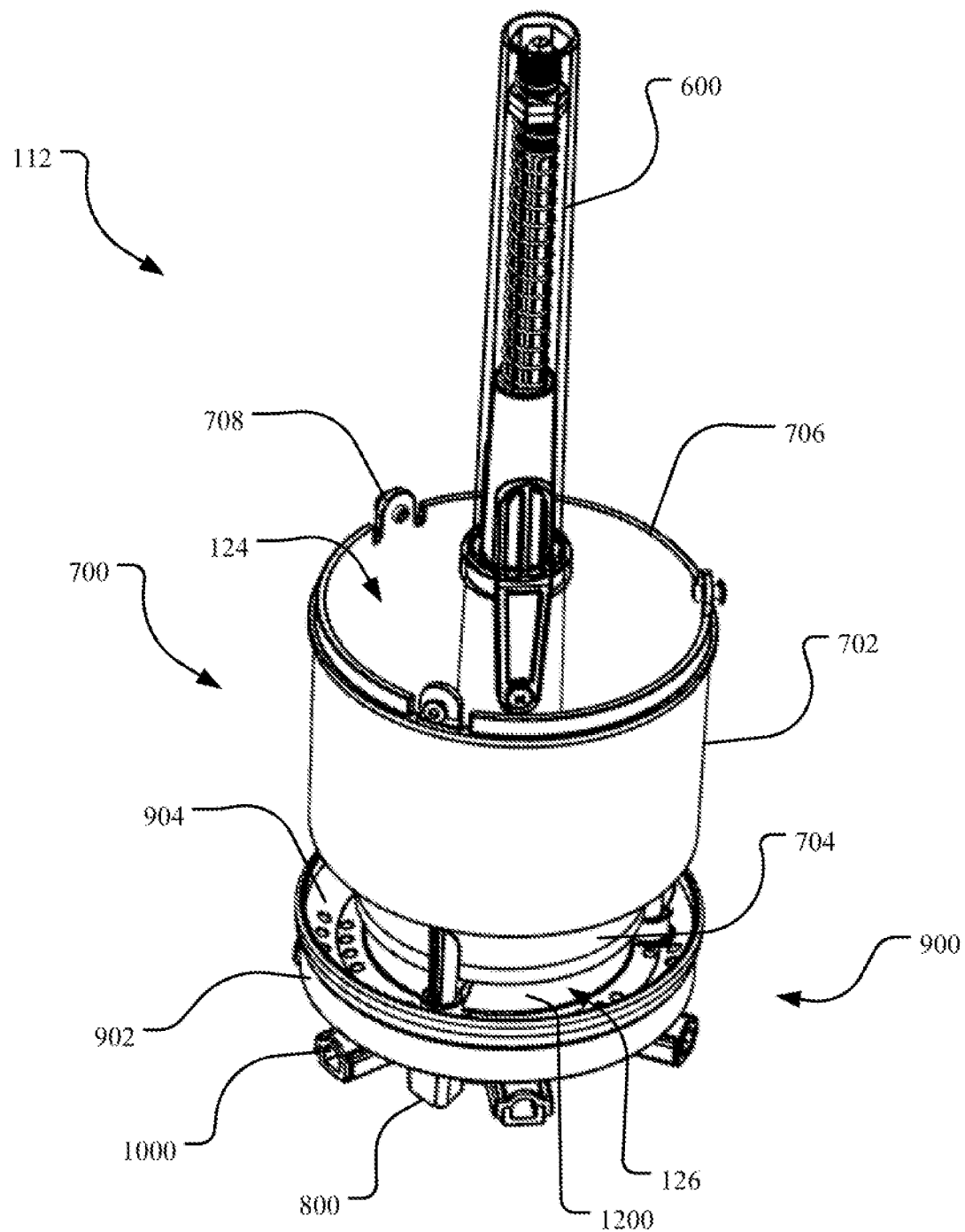
Figure 14B:
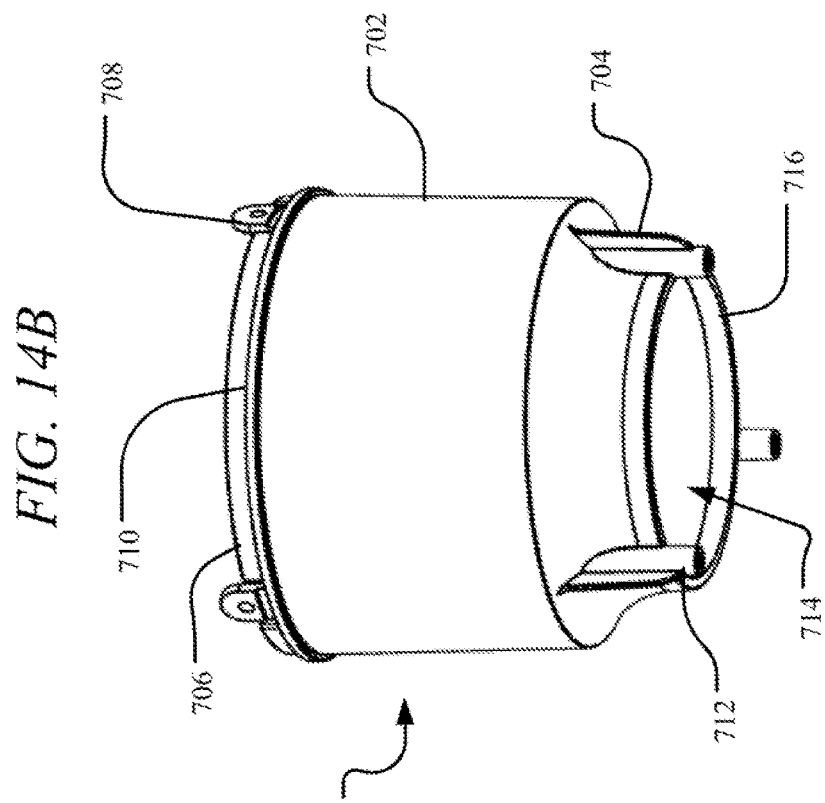
FIGS. 14A and 14B illustrates top perspective and bottom perspective views, respectively, of an example dispenser.
Figure 14A:
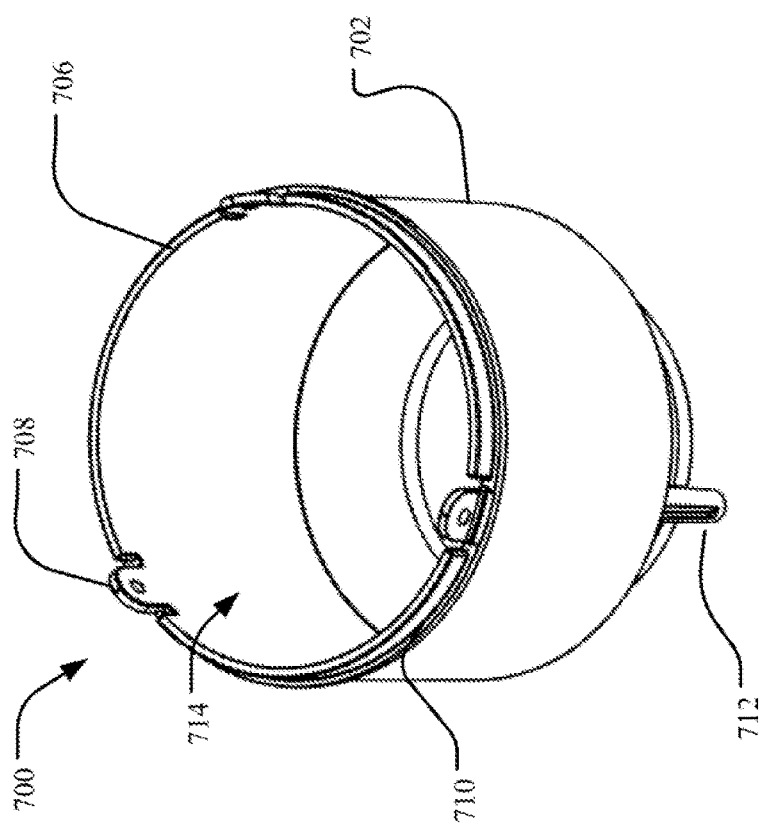
Figure 15:
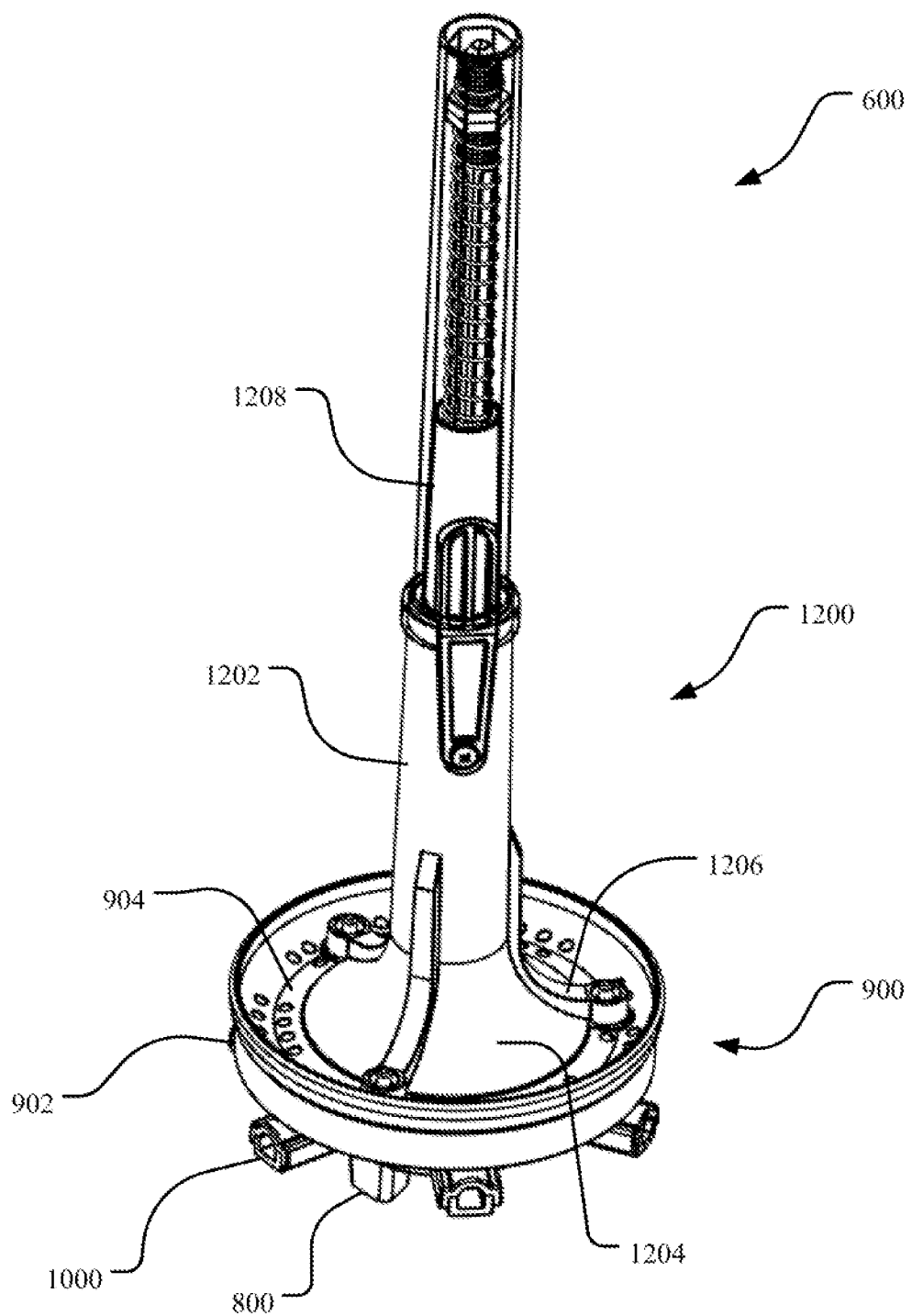
FIGS. 15 and 16 show side perspective and bottom perspective views, respectively, of the base assembly of FIGS. 12 and 13 with the dispenser also removed.
Figure 16:
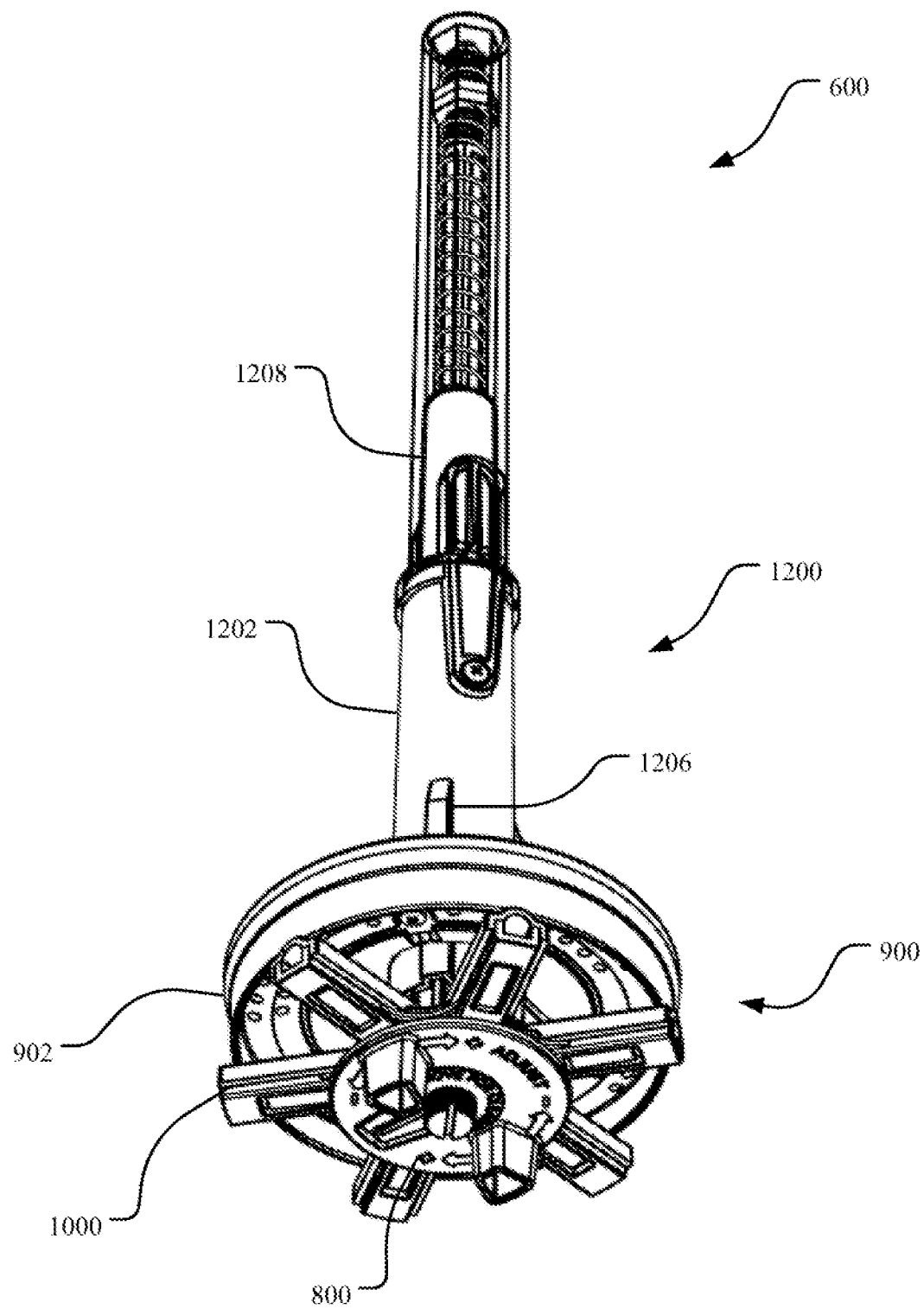
Figure 17B:
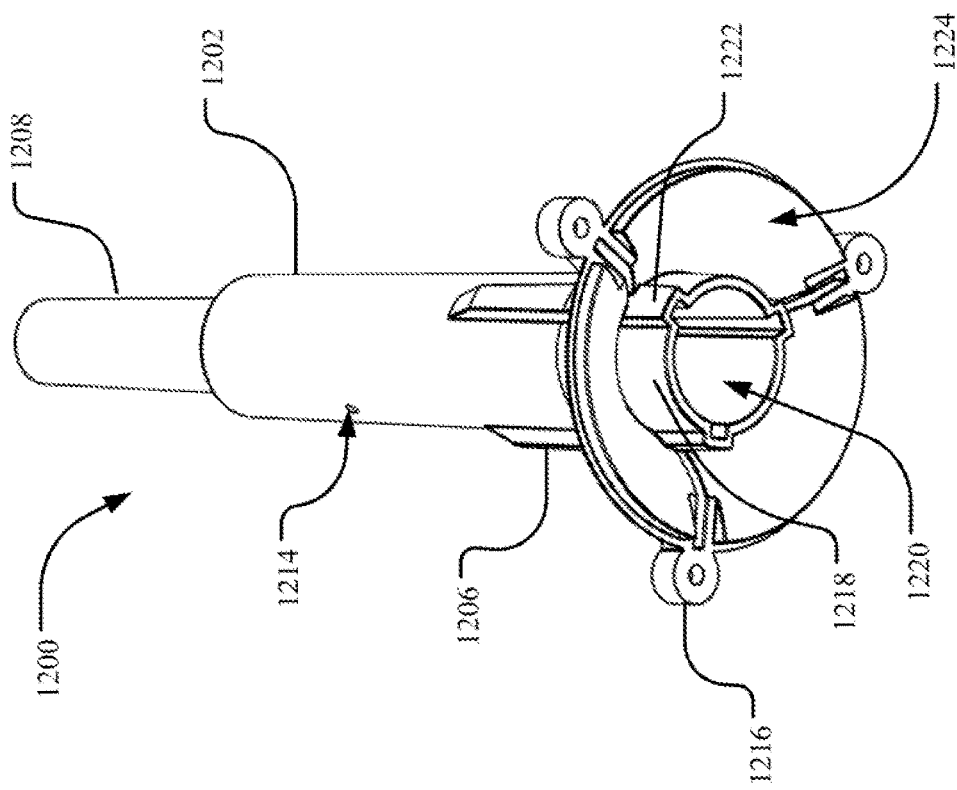
FIGS. 17A and 17B illustrate side perspective and bottom perspective views, respectively, of an example basin mount.
Figure 17A:
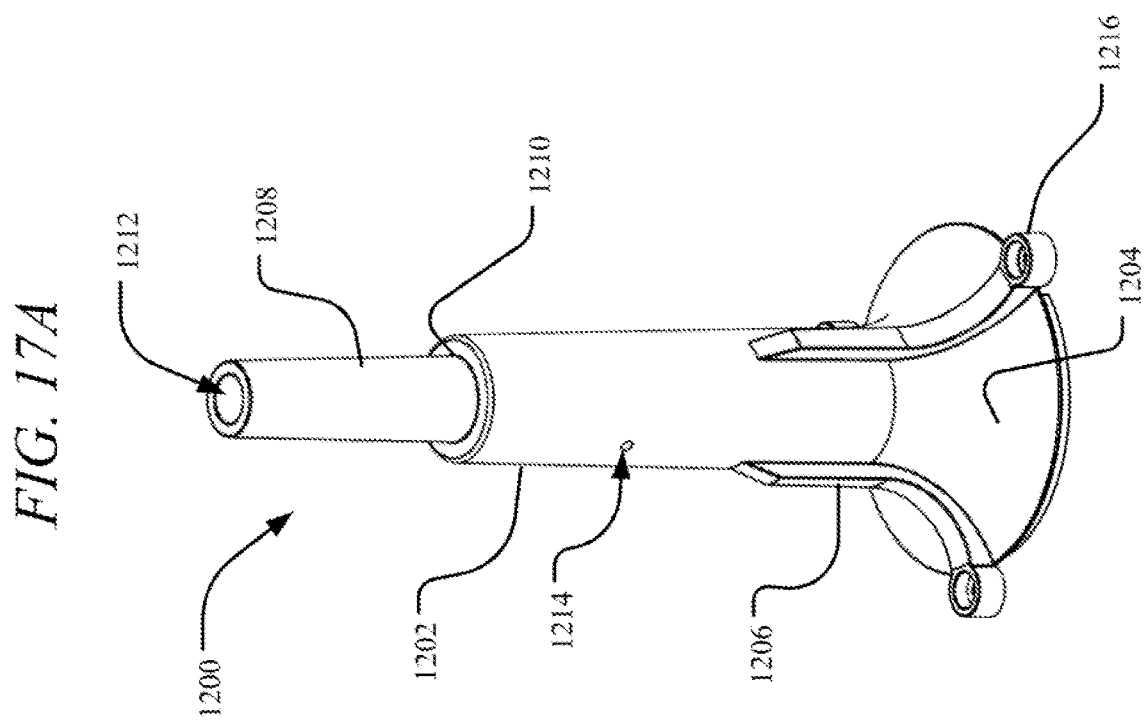
Figure 20B:
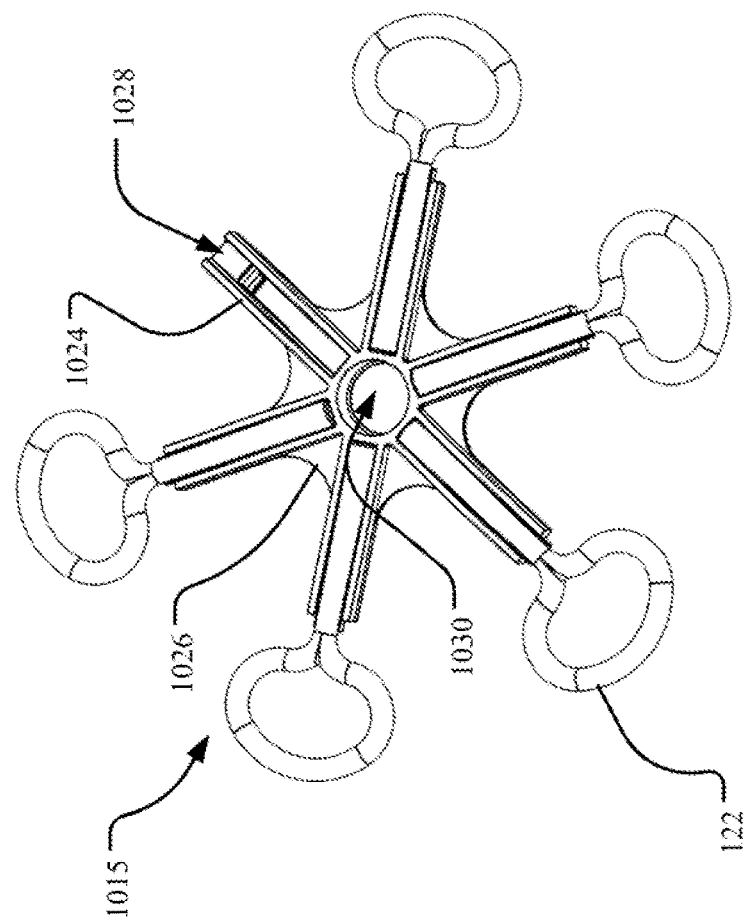
FIGS. 20A and 20B illustrate and example a proximal perch mount assembly and a distal perch mount assembly, respectively.
Figure 20A:
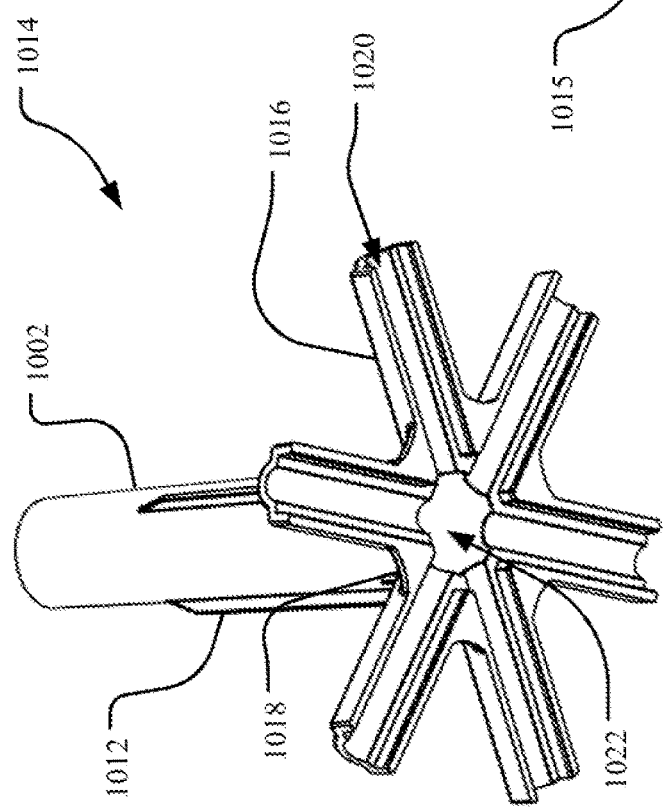

Referring to FIGS. 11A-11C, in one implementation, the sleeve 500 includes one or more sleeve port openings 508 defined in the sleeve body 502. The sleeve port openings 508 from the ports 118. The sleeve body 502 may further include one or more perch openings 510 through which the perches 122 extend relative to the sleeve port openings 508. The sleeve body 502 extends distally to the sleeve distal end 506 and defines a sleeve cavity 518. The sleeve cavity 518 houses the internal components forming the cavity 124, including, but not limited to, the dispenser 700.

In one implementation, the sleeve distal end 506 includes an adjustment surface 512 with one or more adjustment receivers 514 defined therein. For example, the adjustment receivers 514 may be cutouts disposed radially about a sleeve opening 516. The adjustment surface 512 is adapted to engage the adjuster 800, with the adjustment receivers 514 adapted to control an adjustment of the tensioner 600 using the adjuster 800, as described herein. The adjuster 800 may connect to the tensioner 600 via the sleeve opening 516.

Turning to FIGS. 12-14B, in one implementation, the adjuster 800 is connected to the tensioner 600 with an adjuster lock 1100. As described herein, the tensioner 600 translationally mounts the sleeve assembly 114 with respect to the reservoir assembly. In one implementation, the reservoir assembly includes the dispenser 700 is fixed to a basin 900 with the sleeve assembly 114, including a perch mount assembly 1000, translatable with respect thereto.

The dispenser 700 includes a dispenser body 702 extending from a proximal dispensing edge 706 to a distal dispending edge 716 and defining the cavity 124. In one implementation, one or more dispenser lockers 708 extend proximally and are adapted to mount to the distal end of the reservoir 110. The dispenser body 702 may include a dispenser shelf 710 upon which a distal edge of the distal end of the reservoir 110 sits when the reservoir 110 is connected to the dispenser 700. Similarly, one or more legs 712 may extend distally from the dispensing body 702 to mount the dispenser 700 relative to a basin surface 904 of a basin body 902 of the basin 900. In one implementation, the legs 712 are mounted to the basin body 902 with a basin mount 1200.

With reference to FIGS. 13-18B, the dispenser body 702 includes a dispensing cavity 714 that at least partially defines the cavity 124. For example, the cavity 124 may be defined by the dispensing body 702, the basin surface 902, and one or more dispensing surfaces 1204. In one implementation, the dispenser 700 includes one or more directing surfaces 704 adapted to direct the bird food from the cavity 124 onto the dispensing surfaces 1204, which direct the bird food onto the basin surface 904 via one or more dispensing openings 126.

As shown in FIGS. 15-17B, the one or more dispensing surfaces 1204 may be disposed on the basin mount 1200. In one implementation, the basin mount 1200 includes the one or more dispensing surfaces 1204 curving radially outwardly from a mount body 1202. One or more dividers 1206 may be connected to or otherwise extending from the basin mount 1200 to form the dispensing openings 126 and ensure that the bird food is evenly distributed onto the basin surface 904.

In one implementation, an inner mount body 1208 extends proximally from the mount body 1202 and includes a proximal mount opening 1212 from which the tensioner 600 extends. The inner mount body 1207 may be disposed radially inwardly from an outer circumference of the mount body 1202 forming a mount shelf 1210. The mount body 1202 may have various connection points, including one or more cover receivers 1214 and one or more mount connectors 1216. The mount connectors 1216 are configured to connect the legs 712 of the dispenser 700 to the basin 900. For example, as shown in FIGS. 18A-18B, the basin 900 may include one or more basin connectors 908 for connecting to the legs 712 and the mount connectors 1216.

As described herein, the tensioner 600 translationally mounts the sleeve assembly 114 to the reservoir assembly. In one implementation, the basin mount 1200 includes a distal mount body 1218 disposed in a mount cavity 1224. The distal mount body 1218 extends distally from the mount body 1202 under the one or more dispensing surfaces 1204. The distal mount body 1218 may be integral with or separate from the mount body 1202. The distal mount body 1218 defines a distal mount opening 1220. The proximal mount opening 1212 may connect with the distal mount opening 1220 to form a continuous opening through the basin mount 1200. The tensioner 600 may extend through a basin opening 906 and the openings 1212 and 1220 and be connected to the sleeve assembly 114, such that a portion of the sleeve assembly 114 and/or the tensioner 600 translates within the openings 1212 and/or 1220 relative to the basin mount 1200. In one implementation, the basin mount 1200 includes one or more mount channels 1222 to guide the translation within and relative to the basin mount 1200.

As described herein, the basin 900 is fixed within the reservoir assembly and the sleeve assembly 114 translates in relation thereto between the accessible position and the occluded position. The accessible position includes the basin surface 904 being accessible via the one or more ports 118, and the occluded position includes the basin surface 904 being inaccessible via the one or more ports 118. In one implementation, the occluded position includes the ports 118 being disposed distal to the basin surface 904 such that the basin body 902 at least partially occludes the ports 118. For example, the basin body 902 may include a proximal portion 910 and a distal portion 912 forming a side surface that may at least partially occlude the ports 118 in the occluded position. In the accessible position, the side surface may be disposed distal to the ports 118 such that the basin surface 904 is accessible.

Turning to FIGS. 19A-20B, in one implementation, the sleeve assembly 114 includes the perch mount assembly 1000. The perch mount assembly 1000 includes a perch mount body 1002 having a perch mount opening 1004. In one implementation, the tensioner 600 extends through the perch mount opening 1004, and the perch mount body 1002 extends into the distal mount opening 1220 of the basin mount 1200. The tensioner 600 continues extends from the perch mount body 1002 through the proximal mount opening 1212 of the basin mount 1200 into the cavity 124 and/or the interior of the reservoir 110. One or more mount tabs 1012 may be disposed on the perch mount body 1002 and receivable in the one or more mount channels 1222 to guide the translation of the perch mount assembly 1000 within and relative to the basin mount 1200.

In one implementation, the perch mount assembly 1000 includes one or more perch mounts 1006 extending radially outwardly from a perch mount base 1008. The perch mounts 1006 each engage one of the perches 122 within a perch channel 1010. The perch mounts 1006 may each include ratchets or similar features for adjusting a length of the perch 122 extending outwardly from the edge of the perch mount 1006.

The perch mount assembly 1000 may be one integral component or separable into a proximal perch mount assembly 1014 and a distal perch mount assembly 1015. In one implementation, the perch mount opening 1004 is formed at the distal end by a proximal perch mount opening 1022 and a distal perch mount opening 1030. Similarly, the perch mount base 1008 is formed by a proximal perch mount base 1018 connected to a distal perch mount base 1026. A proximal perch mount 1016 is engaged to a distal perch mount 1024 to form each of the perch mounts 1006, with a proximal perch channel 1020 defined in the proximal perch mount 1016 being disposed relative to a distal perch channel 1028 defined in the distal perch mount 1024 to form the perch channel 1010.

Figure 21:
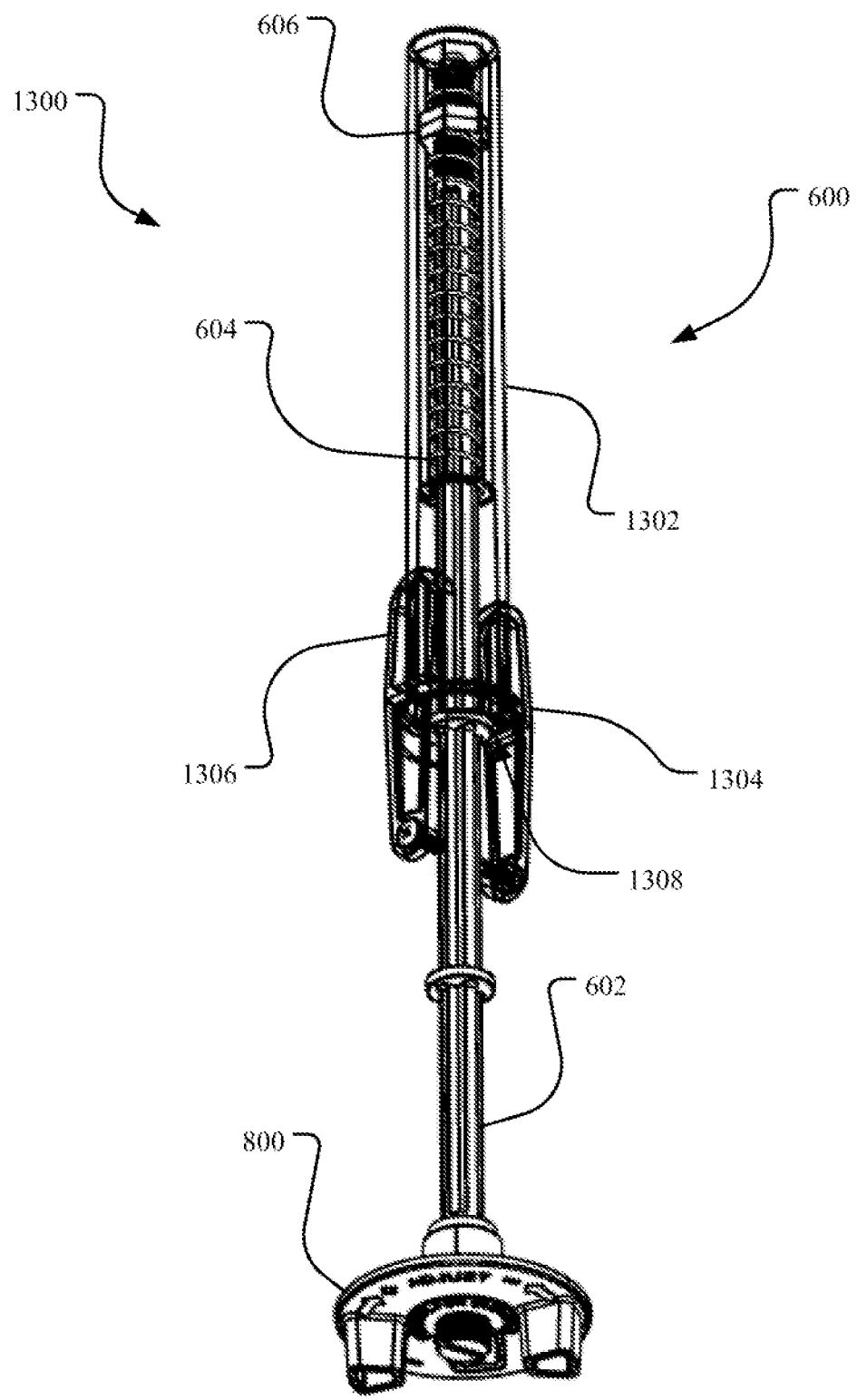
FIG. 21 shows an example tensioner connected to an adjuster.

The tensioner 600 extends through the perch mount opening 1004 into the basin mount 1200, thereby translationally mounting the sleeve assembly 114 relative to the fixed reservoir assembly, including the basin 900. The tensioner 600 may extend through the cavity 124 into the interior of the reservoir 110. As can be understood from FIGS. 21-23, in one implementation, a cover 1300 protects the tensioner 600 within the interior of the bird feeder 100, including the cavity 124 and the interior of the reservoir 110, from contact with the bird food, while ensuring that an indicator 606 is visible from an exterior of the bird feeder 100 for visual reference regarding the weight threshold.

In one implementation, the cover 1300 includes a cover body 1302 defining a cover opening 1308 into which a portion of the tensioner 600 extends. For example, the cover body 1302 may connect to the mount body 1202 with the tensioner 600 extending from the inner mount body 1208 into the cover opening 1308. A distal edge of the cover body 1302 may be connect to the mount shelf 1210 of the mount body 1202 with the inner mount body 1208 of the basin mount 1200 extending into the cover opening 1308. The cover 1300 may be secured to the basin mount 1200 with a first cover arm 1304 and a second cover arm 1306 engaged to the mount body 1202 with the cover receivers 1214.

Figure 22:
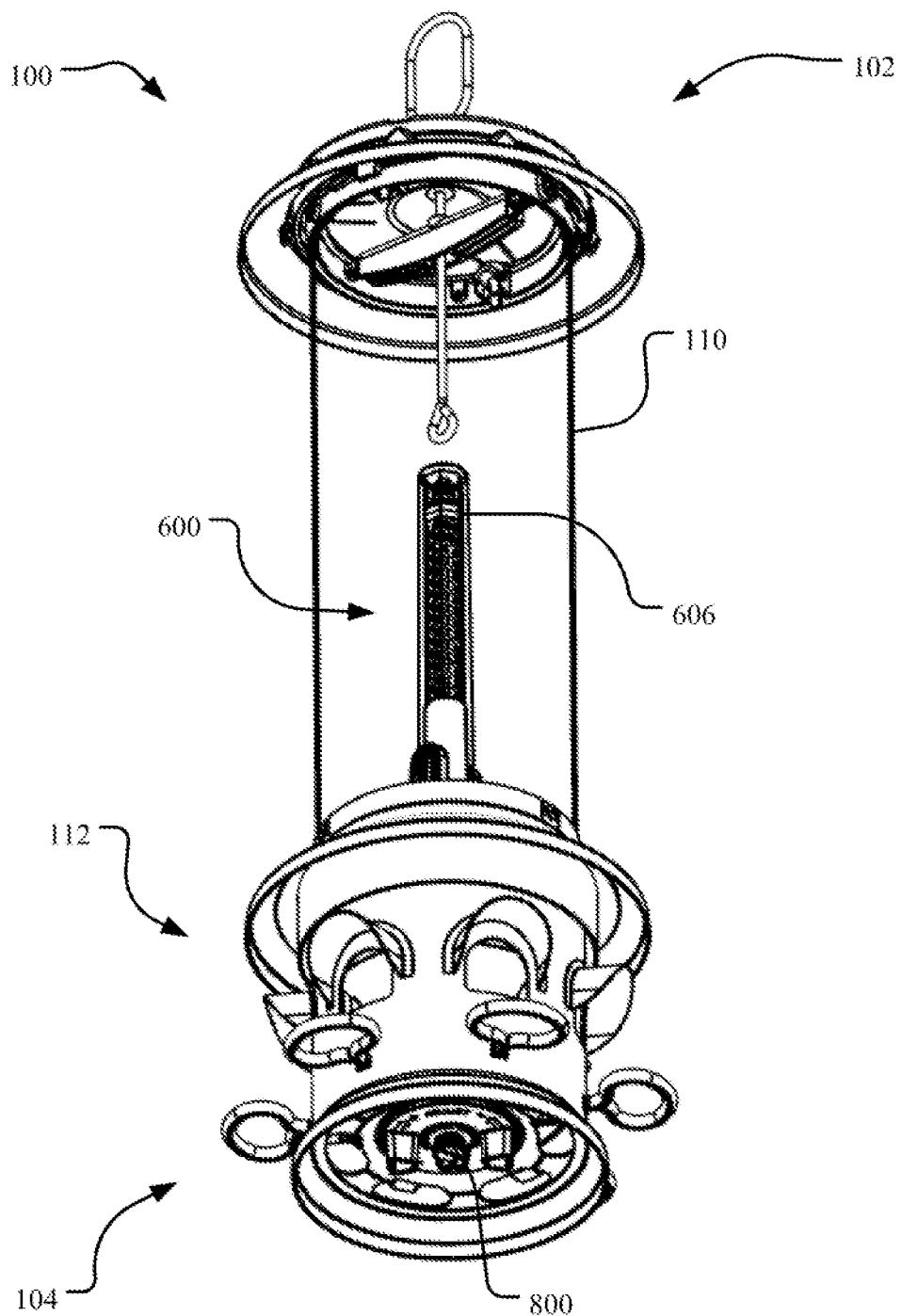
FIG. 22 illustrates an example bird feeder with an indicator being visible from an exterior of the reservoir.
Figure 23:
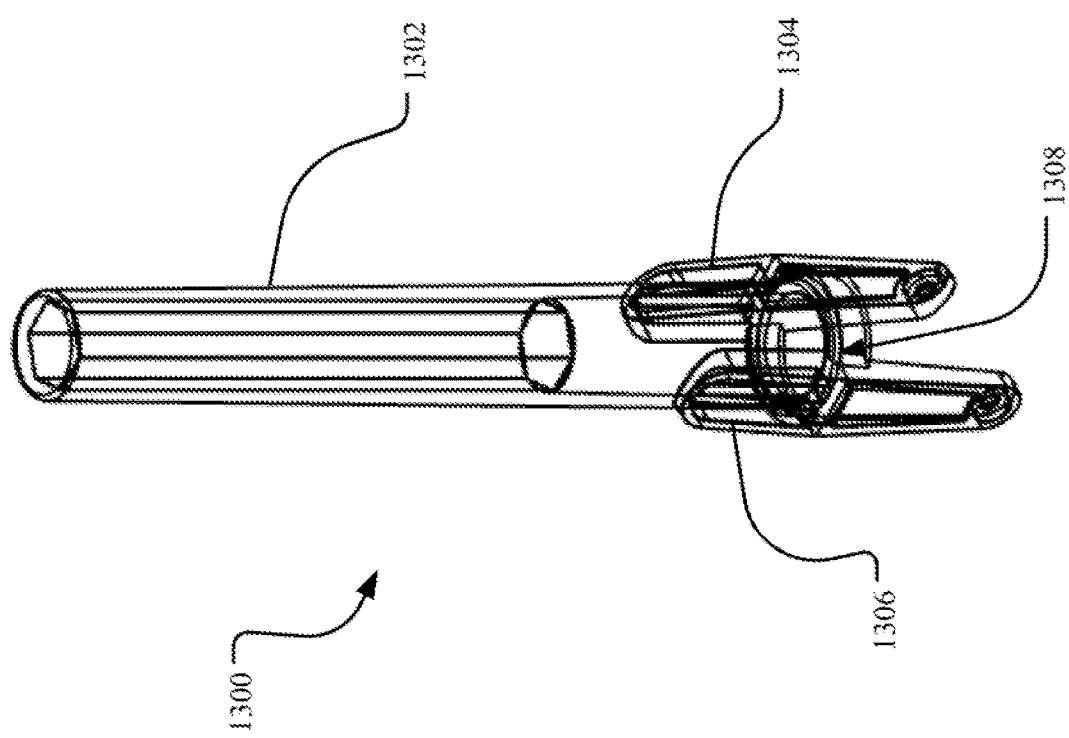
FIG. 23 depicts an example cover for the tensioner.
Figure 24:
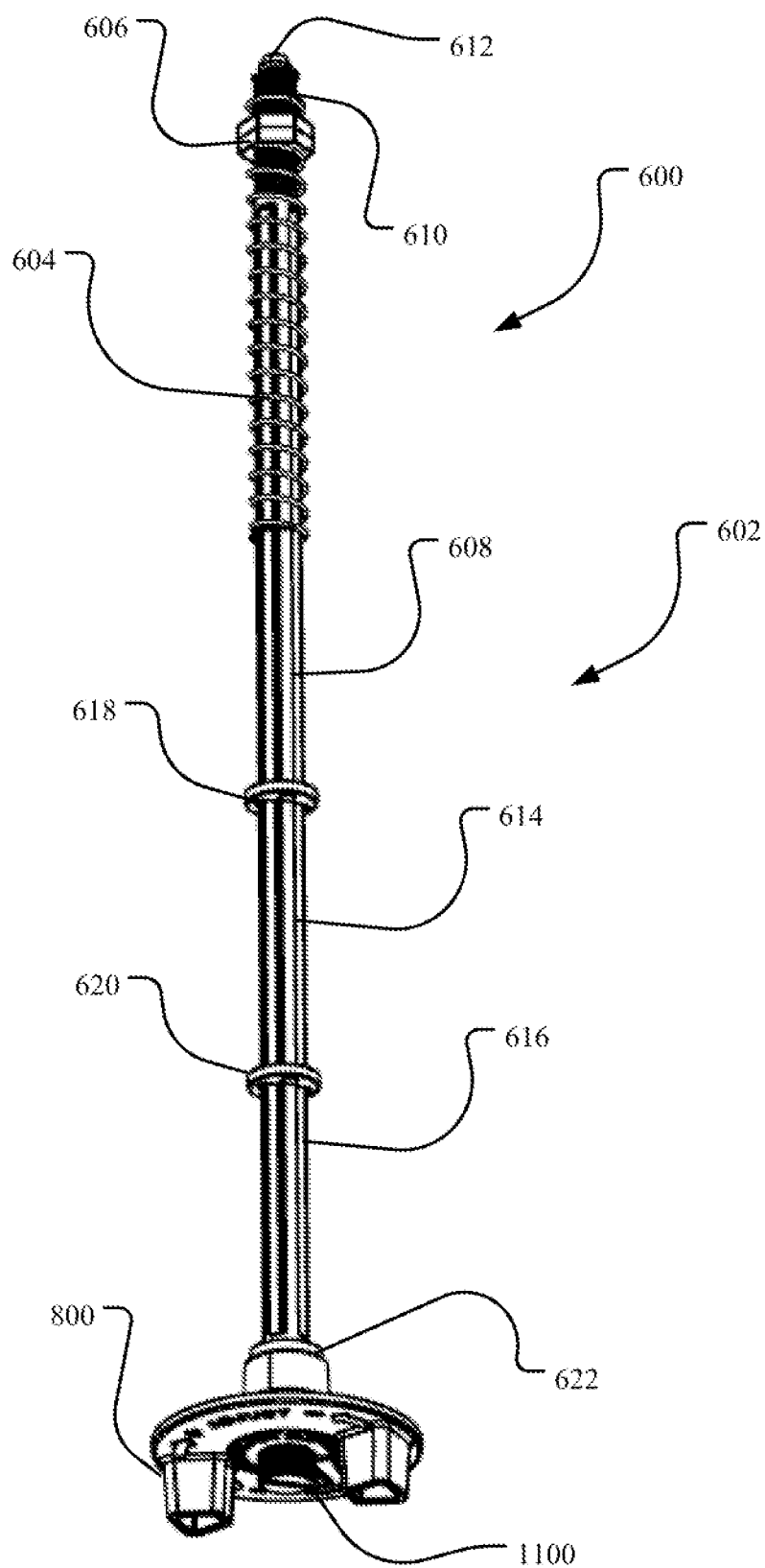
FIG. 24 shows a bottom perspective view of the tensioner connected to the adjuster.

Referring to FIGS. 21-24, in one implementation, the tensioner 600 includes a post 602 extending into the cover opening 1308. Within the cover opening 1308, the tensioner 600 includes a spring 604 extending about the post 602. The spring 604 may include a distal face configured to compress against a compressing surface of the inner mount body 1208 upon an application of weight to the sleeve assembly 114. The spring 604 will compress against the compressing surface according to a spring bias based on the weight threshold set using the adjuster 800. The greater the spring bias, the higher the weight threshold, and the lower the spring bias, the lower the weight threshold. As the adjuster 800 is used to control the weight threshold, the indicator 606 correspondingly adjusts the visible reference, which can be seen from an exterior of the bird feeder 100, for example as shown in FIG. 22. In one implementation, a rotation of the adjuster 800 rotates the post 602, which translates the indicator 606 proximally or distally in coordination thereto.

In one implementation, the post 602 includes an indicator section 610 disposed on a proximal post section 608. The spring 604 extends about the proximal post section 608 distally from the indicator 606, which is adapted to rotate about and translate along the indicator section 610 towards and away from a post tip 612. The movement of the indicator 606 changes the bias of the spring 604 in coordination with the rotation of the post 602 by the adjuster 800 and provides a visual reference of the change and weight threshold. The post 602 includes a post base 622 connectable to the adjustor 800 using the adjuster lock 1100. The post 602 may further include one or more distal post sections (e.g., first and second distal post sections 614-616) and one or more post bodies (e.g., first and second post bodies 618-620) extending through or otherwise connecting with the basin mount 1200, the perch mount assembly 1000, and/or the like.

Figure 25:
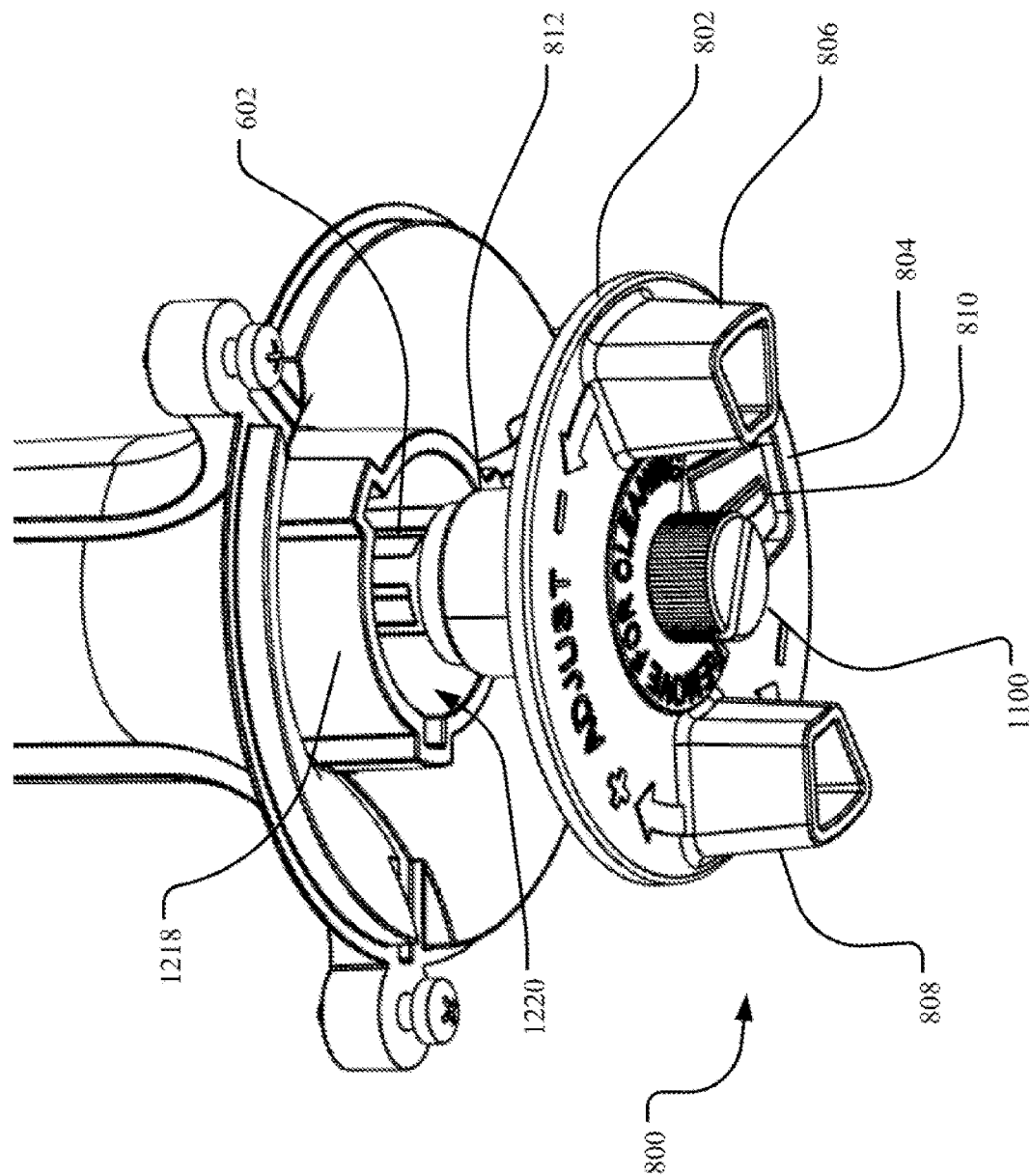
FIG. 25 is a detailed view of the adjuster relative to the tensioner and the basin mount.
Figure 27:
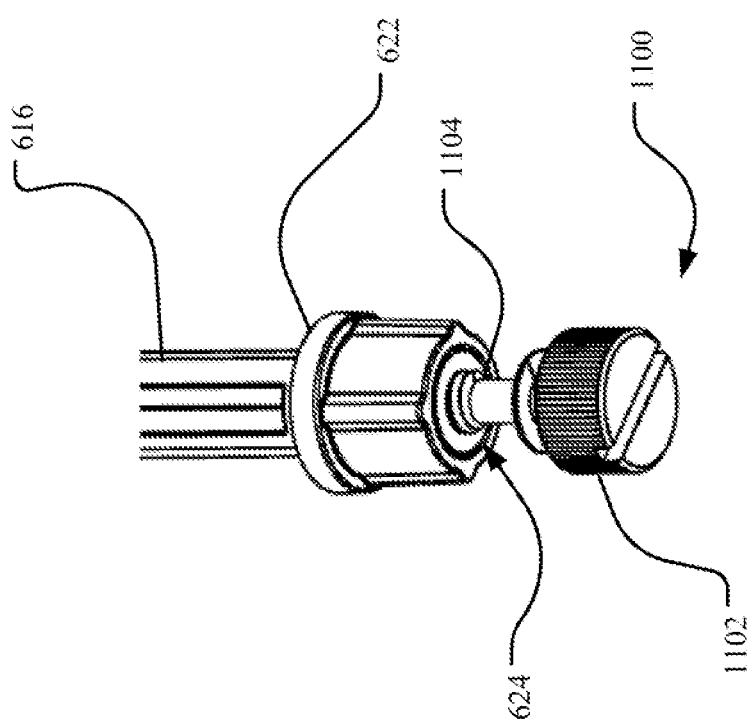
FIG. 27 is a detailed view of an adjuster lock connected to the tensioner.

FIG. 25 shows the tensioner 600 extending from the distal mount opening 1220 of the basin mount 1200 to connect with the adjuster 800, with the perch mount assembly 1000 removed for clarity. As can be understood from FIGS. 25-27, in one implementation, the adjuster 800 includes an adjuster body 802 with a first adjuster leg 806 and a second adjuster leg 808 extending from a distal surface 804. A post receiver 812 extends from a proximal surface 818 and defines a receiver opening 814. In one implementation, the receiver opening 814 includes one or more receiver channels 816 configured to receive corresponding protrusions on the post base 622. The adjuster lock 1102 includes a lock engager 1104 extending from an adjuster lock body 1102 through a lock opening 824 of the adjuster body 802 into a lock opening 624 in the post base 622. With the post base 622 engaged within the receiver opening 814, a rotation of the adjuster body 802 using the adjuster legs 806 and 808 is translated to the post 602 of the tensioner 600 via the mating relationship of the protrusions of the post base 622 with the receiver channels 816. Rotation of the post 602 moves the indicator 606 along the indicator section 610 (rotationally and translationally), thereby increasing or decreasing the tension of the spring 606 and changing the weight threshold.

As described herein, the adjuster 800 is accessible from an exterior of the bird feeder 100, while the indicator 606 provides a visual reference visible from an exterior of the bird feeder 100, to facilitate a controlled adjustment of the weight threshold without disassembly of the bird feeder 100. In one implementation, the adjuster 800 may be mounted outside the sleeve assembly 114 relative to the adjustment surface 512 of the sleeve 500. The proximal surface 818 may be disposed adjacent the adjustment surface 512, such that the adjuster body 802 rotates about the sleeve opening 516. In one implementation, the adjuster 800 includes an adjuster tab 810 defined by a slit 822 in the adjuster body 802, such that the adjuster tab 810 is movable relative to the adjuster body 802. The adjuster tab 810 includes a protrusion 820 extending proximally from the adjuster tab 810 and engageable to the adjustment receivers 514. The engagement of the protrusion 820 of the adjuster tab 810 to one of the adjustment receivers 514 holds the adjuster 800 in place and as such the tensioner 600 at a set weight threshold. Rotating the adjuster body 802 using the adjuster legs 806 and 808 moves the protrusion about the sleeve opening 516 until a desired weight threshold is reached and the protrusion 820 is engaged to a corresponding adjustment receiver 514.

Based upon design preferences, it is understood that the specific order or hierarchy of steps in the methods described herein can be rearranged while remaining within the disclosed subject matter. Any accompanying method claims present elements of the various steps in a sample order and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The above specification, examples, and data provide a complete description of the structure and use of example implementations of the invention. Various modifications and additions can be made to the exemplary implementations discussed without departing from the spirit and scope of the presently disclosed technology. For example, while the implementations described above refer to particular features, the scope of this disclosure also includes implementations having different combinations of features and implementations that do not include all of the described features. Accordingly, the scope of the presently disclosed technology is intended to embrace all such alternatives, modifications, and variations together with all equivalents thereof.

What is claimed is:

1. A bird feeder resistant to intrusion by a pest, the bird feeder comprising:
  a reservoir extending between a proximal end and a distal end, the reservoir defining an interior;
  a dispenser mounted to the distal end of the reservoir, the dispenser having a cavity;
  a basin having a basin body and a basin surface, the basin mounted to the dispenser;
  at least one dispensing surface disposed relative to the dispenser and the basin surface;
  a dispensing opening through which bird food is dispensable from the cavity onto the basin surface using the at least one dispensing surface;
  a sleeve assembly having a sleeve body and a port defined in the sleeve body;
  a tensioner disposed in a cover within the interior of the reservoir, the tensioner translationally mounting the sleeve body relative to the basin body, the sleeve body translating distally from an accessible position to an occluded position when a weight applied to the sleeve assembly exceeds a weight threshold set by the tensioner, the accessible position including the bird food on the basin surface being accessible through the port, the occluded position including the port being disposed distal to the basin surface such that the bird food on the basin surface is inaccessible through the port;
  a cap assembly connected to the proximal end of the reservoir, the cap assembly including a hanger and a hanger bar, the hanger passing through an opening in the hanger bar with a stop at a distal end of the hanger being unable to pass through the opening such that the hanger is configured to freely translate relative to the cap assembly;

an adjuster controlling the weight threshold set by the tensioner, the adjuster disposed exterior to the sleeve assembly; and an indicator disposed in the interior of and visible through the reservoir, the indicator providing a visual reference of the weight threshold.

2. The bird feeder of claim 1, wherein the sleeve assembly includes a perch extending from the sleeve body relative to the port.

3. The bird feeder of claim 1, wherein the occluded position includes the port being at least partially occluded by the basin body.

4. The bird feeder of claim 1, wherein the basin is mounted to the dispenser with a basin mount.

5. The bird feeder of claim 4, wherein the basin mount includes the at least one dispensing surface.

6. The bird feeder of claim 1, wherein the tensioner includes a spring extending about a post, a tension of the spring setting the weight threshold.

7. The bird feeder of claim 6, wherein the adjuster rotates the post, thereby adjusting the tension of the spring.

8. The bird feeder of claim 7, wherein the indicator moves along an indicator section of the post as the adjuster is rotated.

9. The bird feeder of claim 1, wherein the port is one of a plurality of ports defined in the sleeve body.

10. A bird feeder resistant to intrusion by a pest, the bird feeder comprising:

a reservoir extending between a proximal end and a distal end, the reservoir defining an interior;

a basin mounted to the reservoir, the basin having a basin body and a basin surface, the basin body including a side surface extending about the basin surface, the side surface being entirely solid and continuous from a proximal edge to a distal edge, such that the side surface extends about a center of the basin body without openings;

a sleeve assembly having a sleeve body and a port defined in the sleeve body;

a tensioner translationally mounting the sleeve body relative to the basin body, the sleeve body translating distally from an accessible position to an occluded position when a weight applied to the sleeve assembly exceeds a weight threshold set by the tensioner, the accessible position including bird food on the basin surface being accessible through the port, the occluded position including the port being disposed distal to the basin surface such that the bird food on the basin surface is inaccessible through the port.

11. The bird feeder of claim 10, wherein the basin is indirectly mounted to the reservoir.

12. The bird feeder of claim 11, wherein the basin is indirectly mounted to the reservoir with one or more of a dispenser and a basin mount.

13. The bird feeder of claim 10, wherein the tensioner includes a spring extending about a post, a tension of the spring setting the weight threshold.

14. The bird feeder of claim 10, wherein the weight threshold is controlled by an adjuster accessible from an exterior of the bird feeder.

15. The bird feeder of claim 10, wherein an indicator provides a visual reference of the weight threshold.

16. The bird feeder of claim 10, wherein the side surface is disposed distal to the port in the accessible position and the side surface at least partially occludes the port in the occluded position.

17. The bird feeder of claim 10, wherein the port is one of a plurality of ports defined in the sleeve body.

18. The bird feeder of claim 10, wherein a basin opening is defined in the basin surface, the tensioner extending through the basin opening.

\* \* \* \* \*